United States Patent
Weir et al.

(10) Patent No.: US 10,239,792 B2
(45) Date of Patent: *Mar. 26, 2019

(54) METHOD OF PREPARING CERAMIC POWDERS

(71) Applicant: EEStor, Inc., Cedar Park, TX (US)

(72) Inventors: Richard D. Weir, Cedar Park, TX (US); Carl W. Nelson, Austin, TX (US)

(73) Assignee: EESTOR, INC., Cedar Park, TX (US)

( * ) Notice: Subject to any disclaimer, the term of this patent is extended or adjusted under 35 U.S.C. 154(b) by 651 days.

This patent is subject to a terminal disclaimer.

(21) Appl. No.: 14/475,091

(22) Filed: Sep. 2, 2014

(65) Prior Publication Data

US 2016/0023954 A1 Jan. 28, 2016

Related U.S. Application Data

(63) Continuation of application No. 12/777,251, filed on May 10, 2010, now Pat. No. 8,853,116, and a
(Continued)

(51) Int. Cl.
  *C04B 35/468* (2006.01)
  *C04B 35/626* (2006.01)
  (Continued)

(52) U.S. Cl.
  CPC ........ *C04B 35/4682* (2013.01); *C01B 13/185* (2013.01); *C01B 13/363* (2013.01);
  (Continued)

(58) Field of Classification Search
  CPC ................ C04B 35/4682; C04B 35/49; C04B 35/62625; C04B 35/62655;
  (Continued)

(56) References Cited

U.S. PATENT DOCUMENTS 3,330,697 A   7/1967 Pechini
3,435,104 A * 3/1969 Brandmayr ......... C04B 35/4682
                                                      264/104
(Continued)

FOREIGN PATENT DOCUMENTS

CA   02598787   3/2008
CA   02598754   4/2008
(Continued)

OTHER PUBLICATIONS

Machine translation of JP63248719, publication date Oct. 17, 1988.*
(Continued)

*Primary Examiner* — Jun Li

(74) *Attorney, Agent, or Firm* — Toler Law Group, PC

(57) ABSTRACT

A method of forming composition-modified barium titanate ceramic particulate includes mixing a plurality of precursor materials and a precipitant solution to form an aqueous suspension. The plurality of precursors include barium nitrate, titanium chelate, and a metal or oxometal chelate. The precipitant solution includes tetraalkylammonium hydroxide and tetraalkylammonium oxalate. The method further includes treating the aqueous suspension at a temperature of at least 150° C. and a pressure of at least 200 psi, and separating particulate from the aqueous suspension after treating.

19 Claims, 6 Drawing Sheets

Related U.S. Application Data continuation-in-part of application No. 11/497,744, filed on Aug. 2, 2006, now Pat. No. 7,993,611, and a continuation-in-part of application No. 12/714,537, filed on Feb. 28, 2010, now abandoned, and a continuation-in-part of application No. 12/758,628, filed on Apr. 12, 2010, now abandoned.

(60) Provisional application No. 61/176,684, filed on May 8, 2009, provisional application No. 61/156,167, filed on Feb. 27, 2009, provisional application No. 61/168,518, filed on Apr. 10, 2009.

(51) Int. Cl.
*C04B 35/49* (2006.01)
*C01G 1/02* (2006.01)
*C01G 23/00* (2006.01)
*C01B 13/18* (2006.01)
*C01B 13/36* (2006.01)
*C04B 40/00* (2006.01)

(52) U.S. Cl.
CPC .............. *C01G 1/02* (2013.01); *C01G 23/003* (2013.01); *C01G 23/006* (2013.01); *C04B 35/49* (2013.01); *C04B 35/62655* (2013.01); *C04B 40/0082* (2013.01); *C01P 2002/34* (2013.01); *C01P 2002/72* (2013.01); *C01P 2004/03* (2013.01); *C01P 2004/51* (2013.01); *C01P 2004/53* (2013.01); *C01P 2004/61* (2013.01); *C01P 2004/62* (2013.01); *C01P 2006/40* (2013.01); *C01P 2006/80* (2013.01); *C01P 2006/90* (2013.01); *C04B 2235/3208* (2013.01); *C04B 2235/3215* (2013.01); *C04B 2235/3224* (2013.01); *C04B 2235/3225* (2013.01); *C04B 2235/3244* (2013.01); *C04B 2235/3262* (2013.01); *C04B 2235/441* (2013.01); *C04B 2235/449* (2013.01); *C04B 2235/5436* (2013.01); *C04B 2235/5445* (2013.01); *C04B 2235/5472* (2013.01); *C04B 2235/5481* (2013.01); *C04B 2235/762* (2013.01)

(58) Field of Classification Search
CPC .... C04B 2235/3208; C04B 2235/3215; C04B 2235/3224; C04B 2235/3225; C04B 2235/3244; C04B 2235/3262; C04B 2235/441; C04B 2235/449; C04B 2235/762; C01G 23/003; C01G 23/006; C01P 2002/34

See application file for complete search history.

(56) References Cited

U.S. PATENT DOCUMENTS

| | | |
|---|---|---|
| 3,647,364 A | 3/1972 | Mazdiyasni et al. |
| 3,947,553 A | 3/1976 | Moss et al. |
| 4,034,967 A | 7/1977 | Gustairs |
| 4,054,598 A | 10/1977 | Blum et al. |
| 4,606,906 A | 8/1986 | Ritler et al. |
| 4,643,984 A | 2/1987 | Abe et al. |
| 4,671,618 A | 6/1987 | Wu et al. |
| 4,733,328 A | 3/1988 | Blazej |
| 4,772,576 A | 9/1988 | Kimura et al. |
| 4,778,671 A | 10/1988 | Wusirika et al. |
| 4,834,952 A | 5/1989 | Rollat et al. |
| 4,839,339 A | 6/1989 | Bunker et al. |
| 4,859,448 A | 11/1989 | Klee et al. |
| 4,880,758 A | 11/1989 | Heistand, II et al. |
| 4,886,654 A | 12/1989 | Ohga et al. |
| 4,946,810 A | 8/1990 | Heistand, II et al. |
| 5,011,804 A | 4/1991 | Bergna et al. |
| 5,017,446 A | 5/1991 | Reichman et al. |
| 5,043,843 A | 8/1991 | Kimura et al. |
| 5,045,170 A | 9/1991 | Bullock et al. |
| 5,064,783 A | 11/1991 | Luckevich |
| 5,073,843 A | 12/1991 | Magee |
| 5,082,811 A | 1/1992 | Bruno |
| 5,086,021 A | 2/1992 | Sasaki et al. |
| 5,087,437 A | 2/1992 | Bruno et al. |
| 5,116,560 A | 5/1992 | Dole et al. |
| 5,116,790 A * | 5/1992 | Bruno .................. H01G 4/1254 361/321.4 |
| 5,118,528 A | 6/1992 | Fessi et al. |
| 5,155,072 A | 10/1992 | Bruno et al. |
| 5,196,388 A | 3/1993 | Shyu |
| 5,238,673 A | 8/1993 | Bruno et al. |
| 5,242,674 A * | 9/1993 | Bruno ..................... C01B 13/32 252/519.1 |
| 5,252,311 A | 10/1993 | Riman et al. |
| 5,252,314 A | 10/1993 | DeGuire et al. |
| 5,298,654 A | 3/1994 | DeGuire et al. |
| 5,340,510 A | 8/1994 | Bowen |
| 5,362,472 A | 11/1994 | Lauter et al. |
| 5,407,618 A | 4/1995 | Stephenson |
| 5,417,956 A | 5/1995 | Moser |
| 5,445,806 A | 8/1995 | Kinugasa et al. |
| 5,453,262 A * | 9/1995 | Dawson ............... C04B 35/4682 252/62.9 PZ |
| 5,466,646 A | 11/1995 | Moser |
| 5,514,822 A | 5/1996 | Scott et al. |
| 5,559,260 A | 9/1996 | Scott et al. |
| 5,654,456 A | 8/1997 | Scott et al. |
| 5,708,302 A | 1/1998 | Azuma et al. |
| 5,711,988 A | 1/1998 | Tsai et al. |
| 5,730,874 A | 3/1998 | Wai et al. |
| 5,731,948 A | 3/1998 | Yializis et al. |
| 5,738,919 A | 4/1998 | Thomas et al. |
| 5,744,258 A | 4/1998 | Bai et al. |
| 5,776,239 A | 7/1998 | Bruno |
| 5,777,038 A | 7/1998 | Nishikawa et al. |
| 5,797,971 A | 8/1998 | Zheng et al. |
| 5,800,857 A | 9/1998 | Ahmad et al. |
| 5,833,905 A | 11/1998 | Miki |
| 5,850,113 A | 12/1998 | Weimer et al. |
| 5,867,363 A | 2/1999 | Tsai et al. |
| 5,900,223 A | 5/1999 | Matijevic et al. |
| 5,929,259 A | 7/1999 | Lockemeyer |
| 5,973,175 A | 10/1999 | Bruno |
| 5,973,913 A | 10/1999 | McEwen et al. |
| 5,995,359 A | 11/1999 | Klee et al. |
| 6,005,764 A | 12/1999 | Anderson et al. |
| 6,072,688 A | 6/2000 | Hennings et al. |
| 6,078,494 A * | 6/2000 | Hansen ................. H01G 4/1227 361/321.5 |
| 6,106,797 A | 8/2000 | Muller et al. |
| 6,159,442 A | 12/2000 | Thumm et al. |
| 6,171,571 B1 | 1/2001 | Bedard et al. |
| 6,195,249 B1 | 2/2001 | Honda et al. |
| 6,221,332 B1 | 4/2001 | Thumm et al. |
| 6,228,161 B1 | 5/2001 | Drummond |
| 6,243,254 B1 | 6/2001 | Wada et al. |
| 6,268,054 B1 | 7/2001 | Costantino et al. |
| 6,282,079 B1 | 8/2001 | Nagakari et al. |
| 6,294,620 B1 | 9/2001 | Huang et al. |
| 6,296,716 B1 | 10/2001 | Haerle et al. |
| 6,331,929 B1 | 12/2001 | Masuda |
| 6,352,681 B1 | 3/2002 | Horikawa et al. |
| 6,410,157 B1 | 6/2002 | Nakamura et al. |
| 6,420,476 B1 | 7/2002 | Yamada et al. |
| 6,432,526 B1 | 8/2002 | Arney et al. |
| 6,447,910 B1 | 9/2002 | Wataya |
| 6,485,591 B1 | 11/2002 | Nakao et al. |
| 6,501,639 B2 | 12/2002 | Takafuji et al. |
| 6,550,117 B1 | 4/2003 | Tokuoka et al. |
| 6,589,501 B2 | 7/2003 | Moser et al. |
| 6,599,463 B2 | 7/2003 | Miyazaki et al. |
| 6,627,099 B2 | 9/2003 | Ono et al. |
| 6,673,274 B2 | 1/2004 | Venigalla et al. |

(56) References Cited

U.S. PATENT DOCUMENTS

| | | |
|---|---|---|
| 6,692,721 B2 | 2/2004 | Hur et al. |
| 6,703,719 B1 | 3/2004 | McConnell |
| 6,715,197 B2 | 4/2004 | Okuyama et al. |
| 6,749,898 B2 | 6/2004 | Nakamura et al. |
| 6,790,875 B2 | 9/2004 | Noguchi et al. |
| 6,790,907 B2 | 9/2004 | Takata et al. |
| 6,819,540 B2 | 11/2004 | Allen et al. |
| 6,869,586 B1 | 3/2005 | Moser et al. |
| 6,905,989 B2 | 6/2005 | Ellis et al. |
| 7,061,139 B2 | 6/2006 | Young et al. |
| 7,068,898 B2 | 6/2006 | Buretea et al. |
| 7,091,344 B2 | 8/2006 | Hall et al. |
| 7,147,834 B2 | 12/2006 | Wong et al. |
| 7,164,197 B2 | 1/2007 | Mao et al. |
| 7,182,930 B2 | 2/2007 | Tsay et al. |
| 7,190,016 B2 | 3/2007 | Cahalen et al. |
| 7,211,230 B2 | 5/2007 | Zhou et al. |
| 7,223,378 B2 | 5/2007 | Sterzel |
| 7,228,050 B1 | 6/2007 | Buretea et al. |
| 7,237,634 B2 | 7/2007 | Severinsky et al. |
| 7,247,590 B2 | 7/2007 | Kawabata et al. |
| 7,431,911 B2 | 10/2008 | Shirakawa et al. |
| 7,496,318 B2 | 2/2009 | Miura et al. |
| 7,595,109 B2 | 9/2009 | Weir et al. |
| 7,729,811 B1 | 6/2010 | Weir et al. |
| 7,757,631 B2 | 7/2010 | Devos et al. |
| 7,881,039 B2 | 2/2011 | Lee |
| 7,993,611 B2 | 8/2011 | Weir et al. |
| 2001/0010367 A1 | 8/2001 | Burnell-Jones |
| 2002/0146365 A1 | 10/2002 | Cho et al. |
| 2002/0186522 A1 | 12/2002 | Honda et al. |
| 2003/0052658 A1 | 3/2003 | Baretich et al. |
| 2003/0100438 A1 | 5/2003 | Kuo et al. |
| 2003/0215384 A1 | 11/2003 | Sterzel |
| 2004/0071944 A1 | 4/2004 | Weir et al. |
| 2004/0135436 A1 | 7/2004 | Gilbreth et al. |
| 2004/0163570 A1 | 8/2004 | Vanmaele et al. |
| 2004/0175585 A1 | 9/2004 | Zou et al. |
| 2005/0167404 A1 | 8/2005 | Yamazaki |
| 2006/0022304 A1 | 2/2006 | Rzeznik |
| 2006/0045840 A1 | 3/2006 | Chen et al. |
| 2006/0078492 A1 | 4/2006 | Kurozumi et al. |
| 2006/0133988 A1 | 6/2006 | Kurozumi et al. |
| 2006/0159850 A1 | 7/2006 | Breton et al. |
| 2006/0172880 A1 | 8/2006 | Shirakawa et al. |
| 2006/0182667 A1 | 8/2006 | Zech et al. |
| 2006/0210779 A1 | 9/2006 | Weir et al. |
| 2006/0269762 A1 | 11/2006 | Pulugurtha et al. |
| 2006/0283354 A1 | 12/2006 | Shinoda et al. |
| 2007/0026580 A1 | 2/2007 | Fujii |
| 2007/0040204 A1 | 2/2007 | Pulugurtha et al. |
| 2007/0085212 A1 | 4/2007 | Mao et al. |
| 2007/0103421 A1 | 5/2007 | Sekine et al. |
| 2007/0141747 A1 | 6/2007 | Li et al. |
| 2007/0148065 A1 | 6/2007 | Weir et al. |
| 2007/0199729 A1 | 8/2007 | Siegel et al. |
| 2007/0202036 A1 | 8/2007 | Jongen et al. |
| 2007/0205389 A1 | 9/2007 | Kurozumi et al. |
| 2007/0253145 A1 | 11/2007 | Kurozumi et al. |
| 2008/0016681 A1 | 1/2008 | Eisenring |
| 2008/0026929 A1 | 1/2008 | Jensen et al. |
| 2008/0031796 A1 | 2/2008 | Weir et al. |
| 2008/0044344 A1 | 2/2008 | Shikida et al. |
| 2008/0090006 A1 | 4/2008 | Yoshinaka et al. |
| 2008/0145292 A1 | 6/2008 | Shirakawa et al. |
| 2008/0241042 A1 | 10/2008 | Li et al. |
| 2008/0280161 A1 | 11/2008 | Jang et al. |
| 2008/0318144 A1 | 12/2008 | Watamabe et al. |
| 2009/0001317 A1 | 1/2009 | Okamoto |
| 2009/0001353 A1 | 1/2009 | Shukla et al. |
| 2009/0002802 A1 | 1/2009 | Shibuya et al. |
| 2009/0050850 A1 | 2/2009 | Fukui et al. |
| 2009/0250850 A1 | 10/2009 | Wilson |
| 2009/0326729 A1 | 12/2009 | Hakim et al. |

FOREIGN PATENT DOCUMENTS

| | | |
|---|---|---|
| CN | 1373083 A | 10/2002 |
| CN | 1935659 A | 3/2007 |
| EP | 0439620 A1 | 8/1991 |
| EP | 0206575 B1 | 2/1993 |
| EP | 1013608 A1 | 6/2000 |
| EP | 1020487 A1 | 7/2000 |
| EP | 1148030 A1 | 10/2001 |
| EP | 1296339 A2 | 10/2001 |
| EP | 1500721 A1 | 1/2005 |
| EP | 1598326 A1 | 11/2005 |
| EP | 1626065 A1 | 2/2006 |
| EP | 1724015 A1 | 11/2006 |
| EP | 788040 A1 | 5/2007 |
| EP | 1860068 A1 | 11/2007 |
| JP | 55154321 | 12/1980 |
| JP | 61-103533 A | 5/1986 |
| JP | 63-025205 A | 2/1988 |
| JP | 63-248719 A | 10/1988 |
| JP | 10092685 A | 10/1988 |
| JP | 01179721 | 7/1989 |
| JP | 40-03068102 | 3/1991 |
| JP | 05017150 A | 1/1993 |
| JP | 07291607 A | 11/1995 |
| JP | 11-102834 A | 4/1999 |
| JP | 11147716 | 6/1999 |
| JP | 2001110665 A | 4/2001 |
| JP | 2002356326 A | 12/2002 |
| JP | 2003192343 | 7/2003 |
| JP | 2005-109176 A | 4/2005 |
| KR | 10-0596602 B1 | 7/2006 |
| KR | 10-0773895 B1 | 11/2007 |
| WO | 9108469 A1 | 6/1991 |
| WO | 9316012 | 8/1993 |
| WO | 2004092070 A1 | 10/2004 |
| WO | 2005097704 A1 | 10/2005 |
| WO | 2005097705 A1 | 10/2005 |
| WO | 2006022447 A1 | 3/2006 |
| WO | 2006124670 A2 | 11/2006 |
| WO | 2007015622 A1 | 2/2007 |
| WO | 2007103421 A2 | 9/2007 |
| WO | 2008031189 A1 | 3/2008 |
| WO | 2008031189 B1 | 3/2008 |
| WO | 2008040114 A1 | 4/2008 |
| WO | 2008153585 A1 | 12/2008 |
| WO | 2008155970 A1 | 12/2008 |

OTHER PUBLICATIONS

English translation of JP05330824, publication date Dec. 14, 1993.*
Carter, C. Barry et al., "Ceramic Materials Science and Engineering", 2007, Springer Science + Business Media, LLC; 4 pages.
MSDS: Material Safety Data Sheet, Ammonium Oxalate:, 11 pages.
J. Kuwata et al., "Electrical Properties of Perovskite-Type Oxide Thin-Films Prepared by RF Sputtering", Jpn J. Appl. Phys., Part 1, 1985, 413-15.
Bruno et al., "High-Performance Multilayer Capacitor Dielectrics from Chemically Prepared Powders", Journal of the American Ceramic Society, vol. 76, No. 5, pp. 1233-1241, 1993.
F. Sears et al., "Capacitance—Properties of Dielectrics", University of Physica, Addison Wesley Publishing Company, Inc., Feb. 1984, pp. 516-533.
Mitsubishi Polyester Film Corporation specification sheet for Hostaphan (R) RE film for capacitors, Copyright 2007.
Beheir et al., "Studies on the liquid-liquid extraction and ion and precipitate flotation of Co(II) with decanoic acid", Journal of Radioanalytical and Nuclear Chemistry, Articles, vol. 174m,No. 1 (1992) 13-22.
Liu, "Mixing in a multi-inlet vortex mixer (MIVM) for flash nano-precipitation", Chemical Engineering Science 63, 2008:2829-2842.
Riman, Hydrothermal crystallization of ceramics, Ann Chim Sci Mat., 2002, 27 (6):15-36).
Yang et al. "In Situ-Templated Hyrdothermal Synthesis of FE-doped Anatase Nanorods", ACTA Materialia, Elsevier, Oxford, GB, vol. 53, No. 5, 1 Mar. 2005, pp. 1479-1484.

(56) References Cited

OTHER PUBLICATIONS

Jian-Lan Tang et al, "Perovskite Pb(Sc1/2Nb1/2)O3 Nanopowders Synthesized by Surfactant-Modulated Precipitation", Journal of Nanoparticle Research; An Interdisciplinary Forum for Nanoscale Science and Technology, Kluwer Academic Publishers, Do, vol. 11, No. 2, Apr. 26, 2008, pp. 355-363.

* cited by examiner

METHOD OF PREPARING CERAMIC POWDERS

CROSS-REFERENCE TO RELATED APPLICATIONS

The present application is a continuation of U.S. patent application Ser. No. 12/777,251, filed May 10, 2010, entitled "METHOD OF PREPARING CERAMIC POWDERS" naming Richard D. Weir and Carl W. Nelson, currently allowed, which:

is a continuation-in-part of U.S. patent application Ser. No. 11/497,744, filed Aug. 2, 2006, entitled "METHOD OF PREPARING CERAMIC POWDERS USING AMMONIUM OXALATE," naming inventors Richard D. Weir and Carl W. Nelson;

is a continuation-in-part of U.S. patent application Ser. No. 12/714,537, filed Feb. 28, 2010, entitled "REACTION TUBE AND HYDROTHERMAL PROCESSIN FOR THE WET CHEMICAL CO-PRECIPITATION OF OXIDE POWDERS," naming inventors Richard D. Weir and Carl W. Nelson, which claims priority from U.S. Provisional Patent Application No. 61/156,167, filed Feb. 27, 2009, entitled "REACTION TUBE AND HYDROTHERMAL PROCESSING FOR THE WET CHEMICAL CO-PRECIPITATION OF OXIDE POWDERS," naming inventors Richard D. Weir and Carl W. Nelson;

is a continuation-in-part of U.S. patent application Ser. No. 12/758,628, filed Apr. 12, 2010, entitled "HYDROTHERMAL PROCESSING IN THE WET-CHEMICAL PREPARATION OF MIXED METAL OXIDE CERAMIC POWDERS," naming inventors Richard D. Weir and Carl W. Nelson, which claims priority from U.S. Provisional Patent Application No. 61/168,518, filed Apr. 10, 2009, entitled "HYDROTHERMAL PROCESSING IN THE WET-CHEMICAL PREPARATION OF MIXED METAL OXIDE CERAMIC POWDERS," naming inventors Richard D. Weir and Carl W. Nelson; and claims priority from U.S. Provisional Patent Application No. 61/176,684, filed May 8, 2009, entitled "METHOD OF PREPARING CERAMIC POWDERS," naming inventor Richard D. Weir. All applications as listed in this Related Applications section are incorporated herein in their entireties.

FIELD OF THE INVENTION

The present invention relates to methods for preparing ceramic powders, and particularly to wet-chemical processes using a solution of oxalate compound and tetramethylammonium hydroxide as the precipitant.

BACKGROUND OF THE INVENTION

Ceramic powders are used in the fabrication of numerous different types of devices including specialized mechanical components, coating for mechanical components, semiconductor devices, superconducting devices, device packaging, passive electronic components such as capacitors, and more sophisticated energy storage devices. Numerous different techniques exist for the synthesis and fabrication of ceramic powders including solid phase synthesis, such as solid-solid diffusion, liquid phase synthesis such as precipitation and co-precipitation, and synthesis using gas phase reactants.

Despite the advantages of wet chemical processes, the ceramics industry largely remains reluctant to employ these techniques. Conventional methods for preparing ceramic powders entail mechanical mixing of dry powders of water-insoluble carbonates, oxides, and sometimes silicates, where each constituent of the ceramic composition is carefully selected individually. For example, if the ceramic composition has nine constituents in solid solution, then correspondingly nine starting powders are selected in accordance with the amount of each required for the end product compound. The starting powders are likely to have different median particle sizes and different particle size distributions. In an attempt to comminute the mixture of powders to a smaller, more uniform particle size and size distribution for each component, the powder mixture is placed in a ball mill and milled for several hours. The milling process generates wear debris from the ball mill itself and, the debris becomes incorporated in the powder mixture. Because of the often wide disparity in particle size among the various commercially available starting powders (and even significant variation in particle size of the same powder from lot to lot), a desirable result from ball milling rarely occurs, and a contamination-free product is not obtained.

Moreover, additional processing steps are still required. Solid-solid diffusion at high temperature (but below the temperature at which rapid sintering starts) of the ball-milled powder mixture is used to form homogeneous single powders. The finer each powder in the mixture is, the higher the particle surface-to-volume ratio is for each, meaning that there is a greater surface area per unit weight of each powder for the solid-solid diffusion to occur. Moreover, longer times spent at high temperature (e.g., the calcining temperature) produce a more satisfactory end product. Homogeneity is improved by repeating several times the ball-milling and calcining steps in succession, each requiring several hours. Of course, this increases the amount of ball-milling wear debris added to the powder, thereby increasing the amount of contamination in the end ceramic product.

Accordingly, it is desirable to have improved wet-chemical processing techniques to prepare ceramic powders for use in the fabrication of various different devices and materials.

BRIEF DESCRIPTION OF THE DRAWINGS

A more complete understanding of the present invention and advantages thereof may be acquired by referring to the following description and the accompanying drawings, in which like reference numbers indicate like features.

The use of the same reference symbols in different drawings indicates similar or identical items.

DETAILED DESCRIPTION

Figure 1:
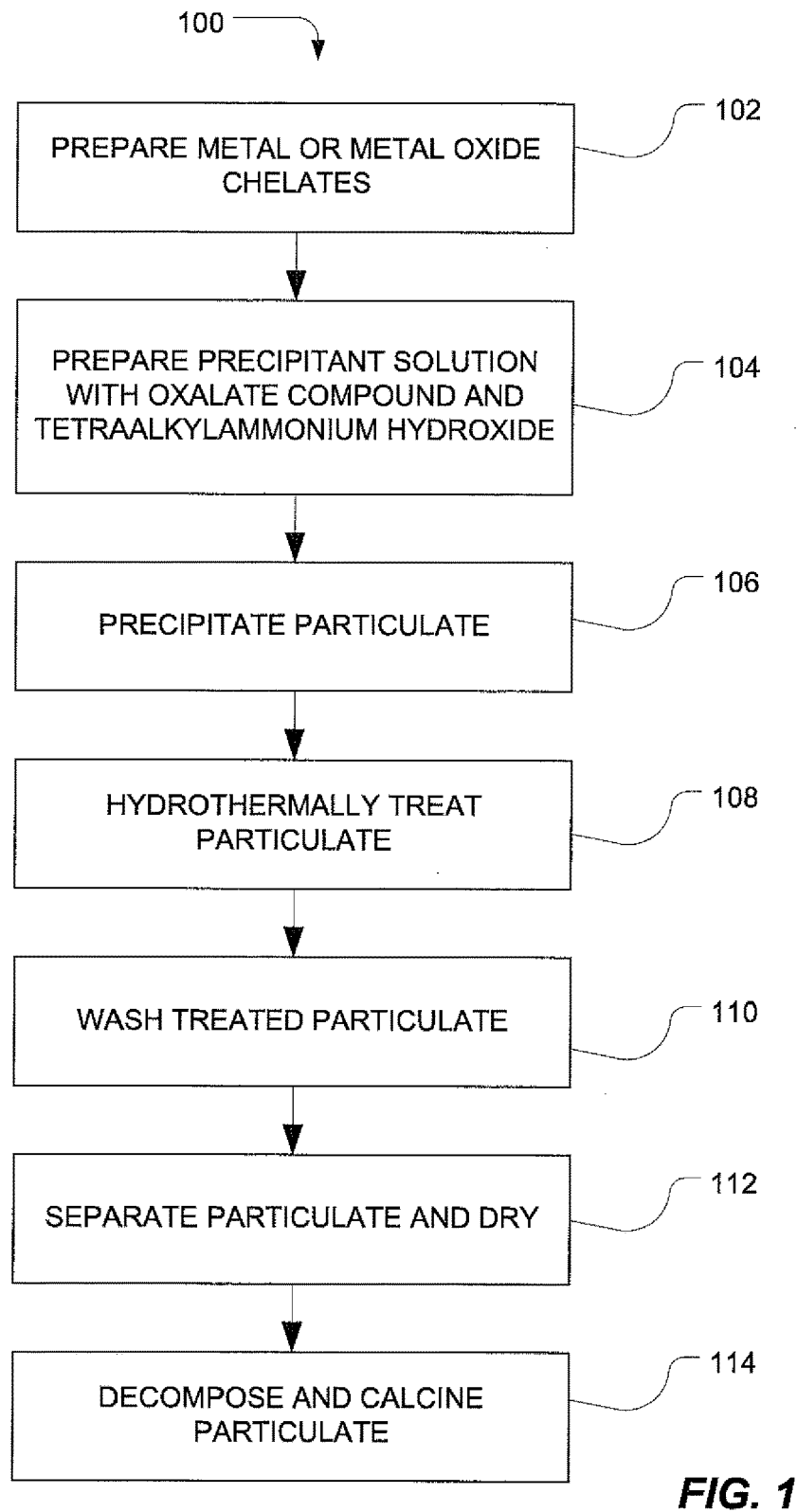
FIG. 1 includes a flow chart illustrating ceramic powder processing techniques.

The following sets forth a detailed description of at least the best contemplated mode for carrying out the one or more devices and/or processes described herein. The description is intended to be illustrative and should not be taken to be limiting.

The processes and techniques described herein can be utilized to prepare numerous different types of ceramic powders, as will be understood to those skilled in the art. Thus, although the present application emphasizes the use of these processes and techniques in the fabrication of dielectric materials for use in electrical energy storage devices (e.g., doped or composition-modified barium titanate), the same or similar techniques and processes can be used to prepare other ceramic powders, and those ceramic powders may find application in the manufacture of various components, devices, materials, etc.

High-permittivity calcined composition-modified barium titanate powders can be used to fabricate high-quality dielectric devices. U.S. Pat. No. 6,078,494 (hereby incorporated by reference herein in its entirety) describes examples of various doped barium titanate dielectric ceramic compositions. More specifically, the '494 patent describes a dielectric ceramic composition comprising a doped barium-calcium-zirconium-titanate of the composition $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_z O_3$, where A=Ag, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 < \delta \leq 0.01$, and $0.995 \leq z \leq 1$ and $0 \leq \alpha \leq 0.005$. These barium-calcium-zirconium-titanate compounds have a perovskite structure of the general composition $ABO_3$, where the rare earth metal ions Nd, Pr, Sm, and Gd (having a large ion radius) are arranged at A-sites, and the rare earth metal ions Dy, Er, Ho, Yb, the Group IIIB ion Y, and the Group IIIA ion Ga (having a small ion radius) are arranged at B-sites. The perovskite material can include the acceptor ions Ag, Zn, Dy, Er, Ho, Y, or Yb or the donor ions Nb, Mo, Nd, Pr, Sm, or Gd at lattice sites having a different local symmetry. Donors and acceptors form donor-acceptor complexes within the lattice structure of the barium-calcium-zirconium-titanate. The dielectric ceramic compositions described by the '494 patent are just some of the many types of ceramic compositions that can be fabricated using the processes and techniques described herein.

An exemplary process includes preparing precursor chelates, providing the precursor chelates in a combined solution with other metal or oxometal ion constituents of a ceramic powder, preparing a precipitant solution including tetraalkylammonium hydroxide and an oxalate compound, such as ammonium oxalate or tetraalkylammonium oxalate, combining the combined solution and the precipitant solution to coprecipitate particles, hydrothermally treating the particles, washing and separating the particles, and heat treating the particles to undergo decomposition and calcining. The precursor chelates can be prepared individually.

Chelates are used as precursors to one or more of the constituent components of a target ceramic powder. In general, chelation is the formation or presence of bonds (or other attractive interactions) between two or more separate binding sites within the same ligand and a single central atom. A molecular entity in which there is chelation (and the corresponding chemical species) is called a chelate. The terms bidentate (or didentate), tridentate, tetradentate . . . multidentate are often used to indicate the number of potential binding sites of the ligand, at least two of which are used by the ligand in forming a chelate.

For example, various wet-chemical powder preparation techniques for composition-modified barium titanate are described below. The methods make use of aqueous solutions for some or all reactants to form by co-precipitation the desired powders. Furthermore, the approach extends the use of one or more chelates (preferably water-soluble or water stable) as precursors to several of the component metal ions comprising the constituents of the composition-modified barium titanate. In an example, ammonium oxalate (also known as diammonium ethanedioate) or tetraalkylammonium oxalate, such as tetramethylammonium oxalate (also known as bis(tetramethylammonium) ethanedioate), in combination with tetraalkylammonium hydroxide, such as tetramethylammonium hydroxide, are used as the precipitant for the mixture of precursors in aqueous solution.

The volume amount of solution can be determined from the molar concentration, when the specific gravity at 20° C. in addition to the molal concentration is known. Since the oxalate anion is doubly negatively charged and the hydroxide anion (e.g., a tetraalkylammonium hydroxide) is singly negatively charged, as precipitants for a given molar concentration, half as many oxalate anions compared to hydroxide anions can be used for the precipitation reaction with the metal-ion cations. The ammonium oxalate or tetraalkylammonium oxalate in aqueous solution is at neutral or near neutral pH (e.g., 6-8 pH), but here the solution is made sufficiently basic with the addition of tetramethylammonium hydroxide to result in a pH in the range of 8.0 to 12.0 pH of the mixed solutions, upon reaction with the neutral or near-neutral pH precursor solution. The average ratio of the 25% tetramethylammonium hydroxide to 25% tetramethylammonium oxalate is respectively 148 grams for every 1000 grams. A suitable temperature range for the formation of aqueous-solution of hydrated oxalate-hydroxide precipitated powders is 95° C. to 99° C.

In an example, oxalate compounds can include ammonium oxalate or tetraalkylammonium oxalate. An exemplary tetraalkylammonium oxalate includes tetramethylammonium oxalate (TMAO), tetraethylammonium oxalate, tetrapropylammonium oxalate, tetrabutylammonium oxalate, or any combination thereof. Ammonium oxalate monohydrate $(NH_4)_2C_2O_4 \cdot H_2O$ is a readily available commodity chemical which can be used as the source for the ammonium oxalate precipitant. Ammonium oxalate monohydrate is typically made by the reaction of oxalic acid and ammonium hydroxide in aqueous solution. At pH 7, there is generally no unreacted oxalic acid and ammonium hydroxide. While the ammonium oxalate is typically used at pH 7, it is often provided by manufacturers in the pH 6.0 to 7.0 range. Tetramethylammonium oxalate is currently available and is similarly prepared.

For the case of tetramethylammonium hydroxide [$(CH_3)_4NOH$] being selected from among the tetraalkylammonium hydroxides, the most concentrated form commercially available is the 25 weight percent aqueous solution with a specific gravity at 20° C. of 1.016, corresponding to 3.6570 molal and 2.7865 molar concentrations. At 80° C., the solubility of ammonium oxalate is 1.8051 molal, and since half as many oxalate anions compared to hydroxide anions are used for the precipitation reaction with the metal-ion cations, the solution volumes are essentially equivalent. For the case of tetramethylammonium oxalate the same molal concentration can be selected.

In wet-chemical methods for the preparation of ceramic powders by co-precipitation of a mixture of precursors from solution, small amounts of precipitant and water typically are included within the micropores and nanopores of the product powder. Similarly, small amounts of precipitant and water may also be adsorbed onto the surface of product powder. During calcination in air of the product powder, half of the oxygen of the oxalate anion in its thermal decomposition becomes part of a mixed oxide compound and the other half with the carbon is converted by oxidation to carbon dioxide gas, and solution residuals such as: ammonium oxalate [$(NH_4)_2C_2O_4$] (any excess amount) or tetramethylammonium oxalate {[$(CH_3)_4N]_2C_2O_4$} (any excess amount), tetramethylammonium hydroxide [$(CH_3)_4NOH$] (any excess amount), ammonium nitrate ($NH_4NO_3$), ammonium 2-hydroxypropanate [$CH_3CH(OH)COONH_4$)], and triammonium 2-hydroxy-1,2,3-propanetricarboxylate [(OH)$C(COONH_4)(CH_2COONH_4)_2$]. These residuals are thermally decomposed and oxidized and thereby completely converted to gaseous products such as $H_2O$, $NH_3$, CO, $CO_2$, $N_2$, $N_2O$, NO, and $NO_2$. The decomposition of these residuals occurs over specified temperature ranges, rates of temperature increase, with acceptable clean dry air to flows to assist in sweeping the gaseous products away at an acceptable rate. The same decomposition generally applies to any 2-hydroxycarboxylic acid that may be selected as a chelating agent, as described below.

In principle, washing of the precipitated powder is optional because residual precipitant, the ammonium oxalate or tetramethylammonium oxalate and tetramethylammonium hydroxide residuals, and other residuals, are volatilized away. In some embodiments, a deionized (DI) water washing step, or some other washing step, is performed. Thus, by the nonmetal-ion-containing ammonium oxalate or tetramethylammonium oxalate and tetramethylammonium hydroxide an aqueous solution of water-soluble hydrated and chelated metal-ion species in their proportioned amounts is precipitated as a hydrated oxalate-hydroxide and by decomposition and calcination in air converted to the oxide (the composition-modified barium titanate).

Preparation of the high-permittivity calcined composition-modified barium titanate powder in this manner yields high-purity powders with narrow particle-size distribution. The microstructures of ceramics formed from these calcined wet-chemical-prepared powders are uniform in grain size and can also result in smaller grain size. Electrical properties are improved so that higher relative permittivities and increased dielectric breakdown strengths can be obtained. Further improvement can be obtained by the elimination of voids within the sintered ceramic body or ceramic/plastic matrix body with subsequent hot isostatic pressing.

In one embodiment, at least one, but not all of the precursors are chelates. A solution of the precursors: $Ba(NO_3)_2$, $Ca(NO_3)_2 \cdot 4H_2O$, $Nd(NO_3)_3 \cdot 6H_2O$, $Y(NO_3)_3 \cdot 4H_2O$, $Mn(CH_3COO)_2 \cdot 4H_2O$, $ZrO(NO_3)_2$, is formed in deionized water, and separately the [$CH_3CH(O—)COONH_4]_2Ti(OH)_2$, solution. In this example, the titanium chelate [$CH_3CH(O—)COONH_4]_2Ti(OH)_2$ can be used. The solution can be mixed or heated (e.g., heated to 95°-99° C.). For a particular composition shown by the atom fraction, the proportionate amount in weight percent for each of the metal-ion constituents is shown in Table 1.

TABLE 1

| Metal element | Atom fraction | At Wt | Product | Wt % |
|---|---|---|---|---|
| Ba | 0.9575 | 137.327 | 131.49060 | 98.52855 |
| Ca | 0.0400 | 40.078 | 1.60312 | 1.20125 |
| Nd | 0.0025 | 144.240 | 0.36060 | 0.27020 |
| Total | 1.0000 | | | 100.00000 |
| Ti | 0.8150 | 47.867 | 39.01161 | 69.92390 |
| Zr | 0.1800 | 91.224 | 16.42032 | 29.43157 |

TABLE 1-continued

| Metal element | Atom fraction | At Wt | Product | Wt % |
|---|---|---|---|---|
| Mn | 0.0025 | 54.93085 | 0.13733 | 0.24614 |
| Y | 0.0025 | 88.90585 | 0.22226 | 0.39839 |
| Total | 1.0000 | | | 100.00000 |

The metal-ion constituents that can be used for the co-precipitation of the composition-modified barium titanate powders used in the seven and nine constituent runs indicated above are identified in the following list: barium, calcium, titanium, zirconium, yttrium, manganese, neodymium, tin, zinc, vanadium, niobium, tantalum, molybdenum, tungsten, lanthanum, hafnium, and chromium, or any combination thereof.

A separate solution of ammonium oxalate or tetramethylammonium oxalate and tetramethylammonium hydroxide somewhat in excess of the stoichiometic amounts, is made in deionized water and heated to 95°-99° C. with the pH in the 8.0 to 12.0 range, preferable about 10.5.

The two solutions are mixed by pumping the heated ingredient streams simultaneously through a fluid jet mixer. Slurry of the co-precipitated powder is produced and after the hydrothermal process, the slurry is filtered, optionally deionized-water or alcohol water mixture washed, and dried. Alternatively, the powder can be collected by centrifugal sedimentation, or some other technique. The subsequent powder is decompositioned and calcined under suitable conditions, e.g., around 1050° C. in air flow in an appropriate silica glass (fused quartz) tray or tube. The maximum calcining temperature can be higher or lower depending on the application.

FIG. 1 is a flow chart illustrating ceramic powder processing techniques in accordance with the present invention. The process begins at 100. In operation, the appropriate precursor materials, e.g., chelates and other precursors, are provided in solution, as illustrated at 102. The precipitant solution including an oxalate compound, such as ammonium oxalate or tetraalkylammonium oxalate, and tetramethylammonium hydroxide is provided, as illustrated at 104. The two materials are then combined to form the desired ceramic powder via a co-precipitation reaction, as illustrated at 106. Hydrothermal treatment of the particle and constituent solution is performed, as illustrated at 108. The ceramic powders are washed, as illustrated at 110, dried and separated, as illustrated at 112, and calcined, as illustrated at 114. The process terminates at 114. The resulting ceramic powder can be used in the fabrication of numerous different devices.

As illustrated at 102, multiple chelate precursors can be formed separately and used in the process to form ceramic powder. In the case of zirconium, various zirconium compounds can be used as precursors. A convenient zirconium precursor is the hydrolytically stable chelate: zirconium(IV) bis(ammonium 2-hydroxypropanato)dihydroxide, also known as zirconium(IV) bis(ammonium lactato)dihydroxide, or [$CH_3CH(O—)COONH_4]_2Zr(OH)_2$, in aqueous solution, which is stable over the pH range from 6 to 8 up to 100° C. Although this compound is not readily available commercially, it can be prepared from any of the alkyl oxides of zirconium(IV). Any of these zirconium(IV) alkyl oxides serve as an intermediate from the zirconium tetrachloride [zirconium(IV) chloride] ($ZrCl_4$) source in the preparation of all other zirconium(IV) compounds. Examples of commercially available zirconium(IV) alkyl oxides include: the ethoxide [$Zr(OCH_2CH_3)_4$], the propoxide [Zr (OCH$_2$CH$_2$CH$_3$)$_4$], the isopropoxide {Zr[OCH(CH$_3$)$_2$]$_4$}, the butoxide [Zr(OCH$_2$CH$_2$CH$_2$CH$_3$)$_4$], and the tert-butoxide {Zr[OC(CH$_3$)$_3$]$_4$}.

Zirconium(IV) isopropoxide (tetra-2-propyl zirconate) is likely to be the lowest cost. Such alkyl oxides are all soluble in alcohols, but hydrolyze in the presence of moisture. By reaction with 2-hydroxypropanoic acid (2-hydroxypropionic acid, lactic acid) [CH$_3$CH(OH)COOH], 85 wt % in aqueous solution, followed with ammonium hydroxide (NH$_4$OH), 28 wt % ammonia (NH$_3$) in water, the water-stable zirconium (IV) chelate is prepared. The other reaction product is the alcohol from which the zirconium(IV) alkyl oxide is originally made in the reaction with the zirconium tetrachloride source. Such alcohol is recoverable by fractional distillation, membrane pervaporization, or the like. Such chelate can also be prepared from an aqueous solution of oxozirconium(IV) nitrate (zirconyl nitrate) [ZrO(NO$_3$)$_2$] by reaction with 2-hydroxypropanoic acid followed with ammonium hydroxide as described above, resulting in a solution of chelate and ammonium nitrate.

The suitable hydrolytically stable titanium(IV) chelate: titanium(IV) bis(ammonium 2-hydroxypropanato)dihydroxide [titanium(IV) bis(ammonium lactato)dihydroxide] {[CH$_3$CH(O—)COONH$_4$]$_2$Ti(OH)$_2$}, is commercially available from, for example, DuPont with trade name Tyzor® LA. It can be prepared from any of the alkyl oxides of titanium(IV). Readily available commercial titanium(IV) alkyl oxides include the following: the methoxide [Ti (OCH$_3$)$_4$], the ethoxide [Ti(OCH$_2$CH$_3$)$_4$], the propoxide [Ti(OCH$_2$CH$_2$CH$_3$)$_4$], the isopropoxide {Ti[OCH(CH$_3$)$_2$]$_4$}, the butoxide [Ti(OCH$_2$CH$_2$CH$_2$CH$_3$)$_4$], and the tert-butoxide {Ti[OC(CH$_3$)$_3$]$_4$}. Of these, titanium(IV) isopropoxide (tetra-2-propyl titanate) is likely to be the least expensive. By similar preparation methods as those described above for the conversion of an alkyl oxide of zirconium(IV) to the water-stable chelate, an alkyl oxide of titanium(IV) can be converted to the water-stable titanium(IV) chelate.

Water-soluble or stable chelates of manganese(II), yttrium (III), lanthanum(III), neodymium(III), and several other metal ions can be prepared with the use of 2-hydroxypropanoic acid (lactic acid) and ammonium hydroxide. The most convenient starting compounds are commercially available water-insoluble carbonates of these metal ions, because they more readily react with 2-hydroxypropanoic acid aqueous solution to form the very stable water-soluble (ammonium 2-hydroxypropanato)metal-ion chelates. Water-insoluble oxides can also be used as starting compounds, although they are not as quickly reactive.

For example, a manganese chelate can be produced when the manganese(II) carbonate (MnCO$_3$) is converted to bis (ammonium 2-hydroxypropanato)manganese(II) (i.e., ammonium manganese(II) 2-hydroxypropanate) {Mn[CH$_3$CH(O—)COONH$_4$]$_2$}, as shown in the following reaction equations:

$$MnCO_3 + 2CH_3CH(OH)COOH \xrightarrow{H_2O}$$
$$Mn[CH_3CH(OH)COO]_2 + H_2O + CO_2(g);$$
$$Mn[CH_3CH(OH)COO]_2 + 2NH_4OH \xrightarrow{H_2O}$$
$$Mn[CH_3CH(O\text{—})COONH_4]_2 + 2H_2O;$$
$$Mn[CH_3CH(O\text{—})COONH_4]_2 \xrightarrow{H_2O}$$
$$Mn[CH_3CH(O\text{—})COO]_2^- + 2(NH_4)^+.$$

Similarly, an yttrium chelate can be produced by converting yttrium(III) carbonate [Y$_2$(CO$_3$)$_3$] to tris(ammonium 2-hydroxypropanato)yttrium(III) (i.e., ammonium yttrium (III) 2-hydroxypropanate) {Y[CH$_3$CH(O—)COONH$_4$]$_3$} as shown in the following reaction equations:

$$Y_2(CO_3)_3 + 6CH_3CH(OH)COOH \xrightarrow{H_2O}$$
$$2Y[CH_3CH(OH)COO]_3 + 3H_2O + 3CO_2(g);$$
$$Y[CH_3CH(OH)COO]_3 + 3NH_4OH \xrightarrow{H_2O}$$
$$Y[CH_3CH(O\text{—})COONH_4]_3 + 3H_2O;$$
$$Y[CH_3CH(O\text{—})COONH_4]_3 \xrightarrow{H_2O}$$
$$Y[CH_3CH(O\text{—})COO]_3^- + 3(NH_4)^+.$$

A lanthanum chelate can be produced by converting lanthanum(III) carbonate [La$_2$(CO$_3$)$_3$] to tris(ammonium 2-hydroxypropanato)lanthunm(III) (i.e., ammonium lanthanum(III) 2-hydroxypropanate) {La[CH$_3$CH(O—)COONH$_4$]$_3$} as shown in the following reaction equations:

$$La_2(CO_3)_3 + 6CH_3CH(OH)COOH \xrightarrow{H_2O}$$
$$2La[CH_3CH(OH)COO]_3 + 3H_2O + 3CO_2(g);$$
$$La[CH_3CH(OH)COO]_3 + 3NH_4OH \xrightarrow{H_2O}$$
$$La[CH_3CH(O\text{—})COONH_4]_3 + 3H_2O;$$
$$La[CH_3CH(O\text{—})COONH_4]_3 \xrightarrow{H_2O}$$
$$La[CH_3CH(O\text{—})COO]_3^- + 3(NH_4)^+.$$

A neodymium chelate can be produced by converting neodymium(III) carbonate [Nd$_2$(CO$_3$)$_3$] to tris(ammonium 2-hydroxypropanato)neodymium(III) (i.e., ammonium neodymium(III) 2-hydroxypropanate) {Nd[CH$_3$CH(O—)COONH$_4$]$_3$} as shown in the following reaction equations:

$$Nd_2(CO_3)_3 + 6CH_3CH(OH)COOH \xrightarrow{H_2O}$$
$$2Nd[CH_3CH(OH)COO]_3 + 3H_2O + 3CO_2(g);$$
$$Nd[CH_3CH(OH)COO]_3 + 3NH_4OH \xrightarrow{H_2O}$$
$$Nd[CH_3CH(O\text{—})COONH_4]_3 + 3H_2O;$$
$$Nd[CH_3CH(O\text{—})COONH_4]_3 \xrightarrow{H_2O}$$
$$Nd[CH_3CH(O\text{—})COO]_3^- + 3(NH_4)^+.$$

In general, nitrate compounds have the highest solubilities in water, as concentration in moles per liter of solution at 20° C., i.e., molar, and moles per 1000 grams of water, i.e., molal, of any salt. Uniquely, there are no water-insoluble nitrates. Since the nitrate anion [(NO$_3$)$^-$] does not interfere with the formation of the chelate, the nitrates, too, can be used as starting compounds. The nitrates are readily available commercially. Accordingly the first reaction of 2-hydroxypropanoic acid with the oxo-metal-ion and metal-ion species as indicated above are as follows:

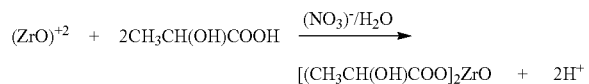

Then with ammonium hydroxide the reaction is:

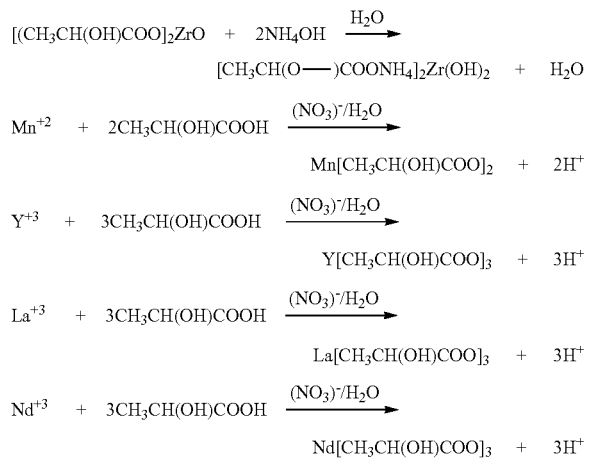

The next-step reactions with ammonium hydroxide are the same as those given above.

In the preparation of the hydrolytically stable chelates illustrated at 102 of FIG. 1, in the reaction of either (1) the titanium(IV) and zirconium(IV) alkyl oxides, or (2) the metal-ion(II) and metal-ion(III) carbonates or nitrates or of the oxozirconium(IV) nitrate with the 2-hydroxypropanoic acid aqueous solution, the more acidic hydrogen ion of the carboxyl group (COOH) splits off first to form (1) the alcohol from which the alkyl oxide was made, or (2) water and carbon dioxide for the carbonates, and hydrogen ions for the nitrates. With addition of the weak base ammonium hydroxide, the hydrogen atom of the hydroxyl group (OH) splits off as a hydrogen ion to form water and the ammonium ion [$(NH_4)^+$] salt of the chelate, such as 2-hydroxypropanate chelate. The hydrogen atom of the hydroxyl group (OH) on the carbon atom (the 2-position or alpha-position) adjacent to the carbonyl group (C=O) is relatively acidic, forming a hydrogen ion splitting off with sufficiently basic conditions provided by the addition of the ammonium hydroxide aqueous solution. Additionally, the presence of the hydroxyl group in the 2-position to the carboxylic acid group results in an increased acidity of the latter.

As a chelating agent, 2-hydroxypropanoic acid is a bidentate ligand, since it can bond to a central metal cation via both oxygen atoms of the five-sided ring. Since the outer cage has two or three anion groups, the total negative charge exceeds the positive charge of the central metal cation, and the chelate is an anion with the ammonium cations [$(NH_4)^+$] for charge balance. Ammonium ion salts have high water solubilities at neutral and near-neutral pH conditions.

Use of hydrolytically stable chelates in this regard is versatile, even though many of the chelate precursors are not readily available commercially. In particular, such chelates have applicability to metal ions of the Periodic Table except, those of Groups IA and perhaps IIA, for co-precipitation procedures in the preparation of ceramic powders. Alkali metal ions do not form complexes and alkaline earth metal ions (Group IIA) form rather weak complexes with 2-hydroxypropanoic acid.

In general, water-soluble 2-hydroxycarboxylic acids (alpha-hydroxycarboxylic acids) form considerably stronger complex molecular ions with most metals ions, through bidentate chelation involving both functional donor groups, than do the corresponding simple carboxylic acids. Such chelates provide, in aqueous solution at neutral and near-neutral pH, hydrolytically stable mixtures of such chelates involving two to nearly all metal ions and oxometal ions in any mole ratio of any one to any other. Moreover, it is important to note that the ammonium compounds: nitrates, 2-hydroxypropanates, etc., thermally decompose and oxidize away as gases, so that they do not have to be washed away from the product precipitate.

In the wet-chemical co-precipitation procedure involving the use of water-soluble hydrolytically stable metal-ion and oxometal-ion chelate precursors and a precipitant solution including an ammonium oxalate or tetramethylammonium oxalate and tetramethylammonium hydroxide for the preparation of ceramic powder, it has been discovered that the reactivity is significantly enhanced by increasing the pH of the precipitant sufficiently to result in the range of 8.0 to 12.0 pH for the reaction at the time of mixing of the two solutions, together with increasing the temperature of these two solutions to 95°-99° C.

The most convenient starting compound for the preparation of oxozirconium(IV) chelates in an oxozirconium(IV) nitrate aqueous solution with a sufficient concentration of nitric acid to prevent hydrolysis. The nitrate anion [$(NO_3)^-$] does not interfere with the formation of the chelate. Among the 2-hydroxycarboxylic acids (alpha-hydroxycarboxylic acids), 2-hydroxy-1,2,3-propanetricarboxylic acid (citric acid) is selected for the oxozironium(IV) chelate for its higher water solubility as concentration in moles per liter of solution at 20° C., i.e., molar, or as moles per 1000 g of water, i.e., molal.

Equations for the preparation of zirconium(IV) (hexaammonium di-2-hydroxy-1,2,3-propanetricarboxylato)dihydroxide [also known as zirconium(IV) (hexaammoniumdicitrato)dihydroxide] from the starting commodity chemical oxozirconium(IV) nitrate [$ZrO(NO_3)_2$] hydrolytically stabilized by nitric acid ($HNO_3$). [$ZrO(NO_3)_2$ is also known as zirconyl nitrate.]

Ammonium hydroxide ($NH_4OH$) and 2-hydroxy-1,2,3-propanetricarboxylic acid (citric acid) [(HO)C(COOH)(CH$_2$COOH)$_2$] are also commodity chemicals.

2-hydroxy-1,2,3-propanetricarboxylic acid (citric acid)

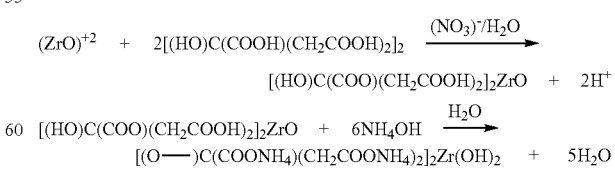

The water-soluble 2-hydroxycarboxylic acid (alpha-hydroxycarboxylic acid) chelates in general are hydrolytically stable over the pH range of 6 to 8. For oxotitanium(IV) and oxozirconium(IV) chelates, gelatinous amorphous hydrous hydroxides are formed above pH 8 and gelatinous amorphous hydrous oxides are formed below pH 6. However, when ammonium oxalate or tetramethylammonium oxalate is present in stoichiometric quantity with 2 to 5 percent excess, even with the addition of tetramethylammonium hydroxide to increase the pH sufficiently to result in a pH in the range of 8.0 to 12.0 at the time of reaction of the precursor and precipitant solutions, and at preferably 95° to 99° C., partial-crystalline hydrated oxalate-hydroxides are formed instead of gelatinous hydrous hydroxides and/or oxides. Interestingly, the 2-hydroxycarboxylic acids and the oxalate anion are bidendate with two oxygen bonding sites within the ligand to the central metal or oxometal ion, and also are both five-sided rings.

The pH of the ammonium oxalate or tetramethylammonium oxalate solution is raised from about 7 to a sufficiently high value so that upon mixing of the two reactant streams the pH is at that point in the range of 8 to 12, preferably about 10.6, where the precipitation occurs to completion at preferably 95°-99° C. for the metal and oxometal ion constituents in the solution.

The pH is adjusted by the addition of a strong base selected from among the tetraalkylammonium hydroxides, such as tetramethylammonium hydroxide $[(CH_3)_4NOH]$, to the point in the pH range of 8 to 12, preferably about 10.6, where precipitation at 95°-99° C. occurs to completion of the metal and oxometal ion constituents.

In the preparation of the metal-ion and oxometal-ion precursor solutions where both 2-hydroxypropanoic acid (lactic acid) $[CH_3CH(OH)COOH]$ and 2-hydroxy-1,2,3-propanetricarboxylic acid (citric acid) $[(OH)C(COOH)(CH_2COOH)_2]$ have been used as the chelating agent, the latter can be preferable because of higher solubilities in water, as concentration in moles per liter of solution at 20° C., i.e., molar, and moles per 1000 grams of water, i.e., molal, are obtained.

Table 2 illustrates an example composition-modified barium titanate compound formed using the above-described chelate precursors. In this example, the formula weight of the resulting compound is 237.24.

ous solution. There are generally two options in this case for the jet fluid column: (1) adjust the former to a flow rate proportionally larger than that of the latter, keeping the stream velocities equal by having the applied driving pressure to the two streams the same, but with the cross-sectional area of the nozzle of the former proportionally larger than that of the latter; and (2) dilute one volume of the latter by a proportional volume of DI water, thereby lowering the concentration of the precipitant. With equal volumes for both streams, the nozzles are alike, the flow rates are equal, and the applied driving pressure is the same. The amount of liquid processed is generally greater than that of the first option, however. The first option has the substantial advantage of reducing the amount of liquid handling and the usage of DI water. Examples of such fluid jet column mixing techniques are described in U.S. Pat. No. 5,087,437 (hereby incorporated by reference herein in its entirety) or are described in relation to FIG. 2.

In other embodiments, other techniques and devices can be used to combine the ingredient streams such as, for example: (1) pouring one solution in one vessel into the other solution in another vessel and using mechanical or ultrasonic mixing, and (2) metering the solution in one vessel at some given flow rate into the other solution in another vessel and using mechanical or ultrasonic mixing. Numerous other mixing techniques will be known to those skilled in the art.

In co-precipitation procedures from aqueous solution where a strong base hydroxide is used as the precipitant, gelatinous amorphous hydrous hydroxides result. Such precipitates can be difficult to filter, e.g., clogging filter cartridges, but also require a lengthy reflux time in the mother liquid, typically at 93° C. at atmospheric pressure for 8 to 36 hours, to densify and transform to the crystalline or near crystalline state, which is desirable to facilitate easy filtration and to obtain a useful product. Although the reflux time can be significantly shortened by use of a high-pressure vessel with steam pressure in the range of 100 atmospheres at 300° C., the vessel, associated valves, actuators, heater, and sensors are complicated and costly. Higher or lower

TABLE 2

| Precursor | FW | Mol Frac. | Product | Wt % |
|---|---|---|---|---|
| $Ba(NO_3)_2$ | 261.34 | 0.47875 | 125.116525 | 44.450 |
| $Ca(NO_3)_2 \cdot 4H_2O$ | 236.15 | 0.02000 | 4.723 | 1.67 |
| $Nd[CH_3CH(O-)COONH_4]_3$ | 465.57 | 0.00125 | 0.5819625 | 0.207 |
| $[CH_3CH(O-)COONH_4]_2Ti(OH)_2$ | 294.08 | 0.40750 | 119.8376 | 42.575 |
| $[CH_3CH(O-)COONH_4]_2Zr(OH)_2$ | 337.44 | 0.09000 | 30.36964375 | 10.789 |
| $Mn[CH_3CH(O-)COONH_4]_2$ | 269.15 | 0.00125 | 0.3364375 | 0.119 |
| $Y[CH_3CH(O-)COONH_4]_3$ | 410.23 | 0.00125 | 0.5127875 | 0.182 |
| Total | | | 281.4779125 | 100.00 |

In one embodiment, the two ingredient streams, one containing the aqueous solution of all the metal-ion compound precursors and the other containing the aqueous solution of the ammonium oxalate or tetramethylammonium oxalate and tetramethylammonium hydroxide are reacted together simultaneously and continuously in a fluid jet column that provides a high turbulence energy environment. The ingredient streams can be heated, for example, to 95°-99° C. The total volume for the saturated or near-saturated commercially available and specially manufactured aqueous solutions of the precursors is typically larger than that of the ammonium oxalate or tetramethylammonium oxalate and tetramethylammonium hydroxide in aquepressures and associated temperatures can be applied depending on the application.

Such issues pertaining to the use of a strong base hydroxide as the solo precipitant can be circumvented by the choice of an aqueous solution of ammonium oxalate or tetramethylammonium oxalate and tetramethylammonium hydroxide, to form at the reaction of the precursor and precipitant solutions a pH in the range of 8.0 to 12.0, as the precipitant. As a precipitant, ammonium oxalate or tetramethylammonium oxalate has the same advantage as tetraalkylammonium hydroxide in being thermally decomposed and oxidized away by conversion to gaseous products during the decomposition and calcination-in-air step of the product powder. However, unlike hydrous hydroxide precipitates, hydrated hydroxide-oxalate precipitates are partial crystalline when formed at, for example, 95°-99° C. in aqueous solution at atmospheric pressure, are more easily filtered, are easily and quickly dried in an oven at, for example, 95° C., and are more easily converted to the desired oxide (or mixed oxide) end product by calcination in air in a silica glass (fused quartz) tube furnace from ambient to approximately 1050° C.

The resulting slurry, following hydrothermal treatment, is transferred from the mixing vessel or hydrothermal tank to a filtration or separation device. Separating the precipitate from the liquid phase and isolating precipitate can be carried out using a variety of devices and techniques including: conventional filtering, vacuum filtering, centrifugal separation, sedimentation, spray drying, freeze drying, or the like. The filtered powder can then undergo various washing, drying, and decomposition and calcining steps as desired.

The advantages of wet-chemical methods in the preparation of powders for fabricating oxide ceramics of technical significance are enlarged in scope with the use, as precursors, of hydrolytically stable chelates of metal ions or oxometal ions at neutral and near-neutral pH, and with the use, as the precipitating agent, of ammonium oxalate or tetramethylammonium oxalate and tetramethylammonium hydroxide aqueous solution with a sufficiently high pH to result in a pH in the range of 8.0 to 12.0 when the precursor and precipitant solutions are reacted. A preferred chelating agent is the very water-soluble 2-hydroxypropanoic acid (i.e., lactic acid) followed by neutralization with the weak-base ammonium hydroxide aqueous solution, both of which are produced in high volume and are thus relatively low in cost. Another preferred chelating agent is the very water-soluble 2-hydroxy-1,2,3-propanetricarboxylic acid, i.e. citric acid, also produced in high volume and relatively low in cost.

In the examples illustrated above, various compounds, solutions, temperature ranges, pH ranges, quantities, weights, and the like are provided for illustration purposes. Those having skill in the art will recognize that some or all of those parameters can be adjusted as desired or necessary. For example, other acids can be used in place of 2-hydroxypropanoic acid as a chelating agent. Alpha-hydroxycarboxylic acids, also known as 2-hydroxycarboxylic acids, having at least the same five-sided ring including the carbonyl group and having the two oxygen atoms of the ring bonding to the central metal ion or oxometal ion can be used and include:
2-hydroxyethanoic acid (i.e., glycolic acid, hydroxyacetic acid) [(OH)CH$_2$COOH];
2-hydroxybutanedioic acid (i.e., malic acid, hydroxysuccinic acid) [HOOCCH$_2$CH(OH)COOH];
2,3-dihydroxybutanedioic acid (i.e., tartaric acid) [HOOC-CH(OH)CH(OH)COOH];
2-hydroxy-1,2,3-propanetricarboxylic acid (i.e., citric acid) [(OH)C(COOH)(CH$_2$COOH)$_2$];
2-hydroxybutanoic acid [CH$_3$CH$_2$CH(OH)COOH];
2-hydroxypentanoic acid [CH$_3$(CH$_2$)$_2$CH(OH)COOH]; and
2-hydroxyhexanoic acid (i.e., 2-hydroxycaproic acid) [CH$_3$(CH$_2$)$_3$CH(OH)COOH].

Such water-soluble chelating agents are also useful in preparing the water-soluble precursors for the co-precipitation procedure, but most are more costly than lactic acid. The first four of these chelating agents have higher solubilities in water, similar to that of 2-hydroxypropanoic acid.

Note that with increasing length of the carbon chain (the nonpolar part of the molecule), the water solubility generally decreases.

The ceramic constituents, including nitrates and chelates are combined with the precipitant solution under turbulent conditions. In an embodiment, the reactor is configured to provide a high turbulence intensity, defined as the product of a dimensionless constant (k) characteristic of the mixing device (approximately 1.0 for the present reactor) and the cube of the velocity of the combined fluid streams in the mixer, divided by the square of the inside diameter of the mixer. For example, the turbulence intensity may be at least $1.5 \times 10^7$ cm/s$^3$, such as at least $10^8$ cm/s$^3$, at least $10^9$ cm/s$^3$, at least $10^{10}$ cm/s$^3$, or even at least $5 \times 10^{10}$ cm/s$^3$. In general, the turbulence intensity is not greater than $10^{20}$ cm/s$^3$. In addition, the tubular reactor may provide an average Reynold's number of at least 20,000. For example, the Reynold's number may be at least 40,000, such as at least 60,000, at least 70,000, or even at least 75,000. In an example, the Reynolds number is not greater than 200,000.

The reactor may be configured for a residence time of at least 50 milliseconds, such as at least 70 milliseconds, or even at least 80 milliseconds. In an example, the reactor is configured for a residence time of not greater than 1 second.

Hydrothermal processing in wet-chemical co-precipitation processes is advantageous. By carrying out the transformation of the powder precipitate from the amorphous or partial-crystalline state to the full-crystalline state or near full-crystalline state under hydrothermal conditions, the time can be greatly shortened and the final powders significantly enhanced. In the context of efficient manufacturing, practical hydrothermal conditions for such a process are a pressure of 100 bar (10 MPa) (1450 psi) and temperature of 300° C. lower or higher pressures and associated temperatures can be used depending on the application. Within a short period of time, of an order of magnitude less than that for the reflux process, with these conditions, a compact, more nearly perfect crystalline structure with complete chemical homogeneity is obtained that is well beyond that obtained with refluxing at atmospheric pressure and 90°-95° C.

Water in the liquid and gaseous states are in equilibrium at 150° C. and 4.758 bar (69.4 psi); at 200° C. and 15.5 bar (225.3 psi). The higher the temperature, the higher the pressure is required with the result that the time is shortened for the completion of a chemically homogenous and crystalline product. The hydrothermal step has the further advantage of narrowing the particle size distribution, since transport is facilitated in aqueous solution with the smaller size having higher surface energy dissolving and the larger size having lower surface energy growing.

The apparatus for this pressure-temperature range is relatively easy to accomplish and is of low cost, (compared to that at 100 bar and 300° C.) with, of course, the requirement of a longer reflux time.

In hydrothermal processing not only temperature and pressure are parameters, but also time is a parameter. A longer time can be traded for a lower temperature-pressure.

In the wet-chemical preparation by co-precipitation procedures of oxide ceramic powder wherein the powder is formed from the reaction of two heated, typically to 95°-99° C., solutions, for example, one containing an aqueous solution of Group IIA metal ion nitrates, such as Ba$^{+2}$ and Ca$^{+2}$, and water-soluble hydrolytically stable chelates of the Group IIIB metal ion Y+3 Group IVB oxometal ions (TiO)$^{+2}$ and (ZrO)$^{+2}$, Lanthanide Group metal ions La$^{+3}$ and Nd$^{+3}$, and the Group VIIB metal ion Mn$^{+2}$, and the other containing an aqueous solution of ammonium oxalate

[(NH$_4$)$_2$C$_2$O$_4$] or tetramethylammonium oxalate {[(CH$_3$)$_4$N]$_2$C$_2$O$_4$} and the strong base tetramethylammonium hydroxide [(CH$_3$)$_4$NOH], a mixed hydrated oxalate-hydroxide product precipitate results. A sufficient amount of the latter is added to increase the pH of the ammonium oxalate or tetramethylammonium oxalate solution to the point in the range of pH 8 to 12, preferably 10.5, where during the reaction of the two solutions the constituent metal and oxometal ions are precipitated. During the hydrothermal treatment step, tetramethylammonium hydroxide [CH3) 4NOH] is added periodically to maintain the pH at 10.0 to 12.0 range.

In the event that an excess amount of (CH$_3$)$_4$NOH is used resulting in increased hydroxide content in the oxalate-hydroxide precipitate (above pH 8, the higher the pH the greater the hydroxide content is in the precipitate), a following reflux step provides chemical homogeneity and crystallinity. In such a reflux step, the precipitate suspended and dispersed in the solution of the remaining products of reactions and excess amount of the two anion precipitants are heated to sufficiently high temperature-pressure for an adequate length of time.

In an example, the ceramic particulate may be formed from precursor materials such as metal nitrates, a metal chelates, or any combination thereof. The metal nitrate or metal chelate may include a metal ion or oxometal ion including a metal or semi-metal of groups 1-14 of the periodic table, the lanthanoid series, or the actinoid series, based on the IUPAC convention. For example, the metal ions may be selected from the group including barium, calcium, titanium, zirconium, yttrium, manganese, neodymium, tin, zinc, vanadium, niobium, tantalum, molybdenum, tungsten, lanthanum, hafnium, chromium, or any combination thereof. In particular, the metal ions include barium, titanium, and at least one of calcium, zirconium, yttrium, manganese, neodymium, tin, zinc, vanadium, niobium, tantalum, molybdenum, tungsten, lanthanum, hafnium, chromium, or any combination thereof. An exemplary metal nitrate includes barium nitrate, calcium nitrate, or a combination thereof.

An exemplary metal chelate includes a metal ion or oxometal ion and a chelating agent. Metal chelates are used as precursors to one or more of the constituent components of the ceramic powder. In general, chelation is the formation or presence of bonds (or other attractive interactions) between two or more separate binding sites within the same ligand and a single central atom. A molecular entity in which there is chelation (and the corresponding chemical species) is called a chelate. The terms bidentate (or didentate), tridentate, tetradentate, and multidentate are often used to indicate the number of potential binding sites of the ligand, at least two of which are used by the ligand in forming a chelate.

In an example, the chelating agent includes a carboxylic acid that may be neutralized with a weak-base. For example, the chelating agent may include 2-hydroxypropanoic acid or an alpha-hydroxycarboxylic acid. An exemplary alpha-hydroxycarboxylic acid includes 2-hydroxyethanoic acid (glycolic acid), 2-hydroxybutanedioic acid (malic acid), 2,3-dihydroxybutanedioic acid (tartaric acid), 2-hydroxy-1,2,3-propanetricarboxylic acid (citric acid), 2-hydroxybutanoic acid, 2-hydroxypentanoic acid, 2-hydroxyhexanoic acid, or any combination thereof. The chelating agent may be neutralized with a weak base, such as ammonium hydroxide (NH$_4$OH). Exemplary chelates are disclosed in U.S. application Ser. No. 11/497,744 incorporated herein by reference in its entirety.

The chelated solution may also include a surfactant. A nonionic surfactant, such as polyoxyethylene(40) nonylphenyl ether, may used in aqueous solutions to suspend and disperse powder. The surfactant concentration in the reacted solution, such as the slurry including the precipitated particulate, is preferably 0.5 volume percent. Alternatively, the surfactant may be added through a separate solution or may be absent.

As illustrated in FIG. 1, the process for forming the ceramic particulate includes preparing metal chelates, as illustrated at 102. For example, a metal or oxometal salt and a chelating agent may be mixed resulting in the metal chelate. In an example, the metal or oxometal salt is a nitrate salt of the metal or oxometal ion. The chelating agent may be 2-hydroxypropanoic acid or an alpha-hydroxycarboxylic acid. The resulting metal chelate may be neutralized with the addition of a weak base, such as ammonium hydroxide, or a strong base, such as tetraalkylammonium hydroxide, and remain in solution. In particular, the metal chelate may be soluble in a solution having a pH in a range of 7 to 8.

Further, metal salts may be added to an aqueous solution including the metal chelates or may be added to an aqueous solution separate from the aqueous solution including the metal chelates. During precipitation, the metal salt solution may be added with the metal chelate solution as precursor materials to the mixed metal oxide ceramic powder. For example, the metal salts may include barium nitrate, calcium nitrate, or a combination thereof.

In a particular embodiment, the solution includes barium nitrate, a titanium chelate, and at least one other metal chelate. For example, the solutions may include barium nitrate, calcium nitrate, a titanium chelate, and one or more other metal chelates, such as at least 4 other metal chelates, or at least 6 other metal chelates.

In addition, a precipitant solution may be prepared, as illustrated at 104. For example, the precipitant solution may be an aqueous solution including tetraalkylammonium hydroxide, ammonium oxalate, tetraalkylammonium oxalate, or a combination thereof. The alkyl group of the tetraalkylammonium hydroxide or tetraalkylammonium oxalate may be a methyl, ethyl, or propyl group, or any combination thereof. In an example, the tetraalkylammonium hydroxide includes tetramethylammonium hydroxide. In a further example, the tetraalkylammonium oxalate includes tetramethylammonium oxalate. In a particular example, the precipitant solution includes both tetraalkylammonium hydroxide and tetraalkylammonium oxalate.

Water-soluble 2-hydroxycarboxylic acid (alpha-hydroxycarboxylic acid) chelates in general are hydrolytically stable over the pH range of 6 to 8. For the case of the oxotitanium (IV) and oxozirconium(IV) chelates, gelatinous amorphous hydrous hydroxides are formed above pH 8 and gelatinous amorphous hydrous oxides are formed below pH 6. When ammonium oxalate or tetramethylammonium oxalate is present in stoichiometric quantity with 2 to 5 percent excess, even with the addition of tetramethylammonium hydroxide to increase the pH sufficiently to result in a pH in the range of 8.0 to 12.0 at the time of reaction of the precursor and precipitant solutions, and at preferably 95° C. to 99° C., partial-crystalline hydrated oxalate-hydroxides are formed instead of gelatinous hydrous hydroxides and/or oxides. Interestingly, the 2-hydroxycarboxylic acids and the oxalate anion are bidendate with two oxygen bonding sites within the ligand to the central metal or oxometal ion, and also are both five-sided rings. In particular, the solution is made sufficiently basic with the addition of tetramethylammonium hydroxide to result in a pH in the range of 8.0 to 12.0 of the mixed solutions, upon reaction with the neutral or near-neutral pH precursor solution. The average ratio of 25% tetramethylammonium hydroxide to 25% tetramethylammonium oxalate is respectively 148 grams for every 1000 grams.

As illustrated at 106, the chelate solution and precipitant solution are mixed to facilitate precipitation, resulting in a suspension including precipitated primary particles. For example, the solutions may be mechanically mixed, ultrasonically mixed, or combined in a tubular reactor. In an example the solutions are injected into a tubular reactor to provide both a desirable turbulence factor and other reaction conditions. In particular, the turbulence factor is at least $1.5 \times 10^7$ cm/s$^3$. The pH of the reaction may be in a range of 8 to 12, such as a range of 10 to 12. The temperature of the reactor may be in a range of 75° C. to 120° C., such as a range of 80° C. to 110° C., a range of 90° C. to 105° C., or even a range of 90° C. to 100° C. The pressure of the streams can be in the range of 90 psi to 120° psi or higher depending on the application. The residence time within the reactor may be at least 50 milliseconds.

Figure 2:
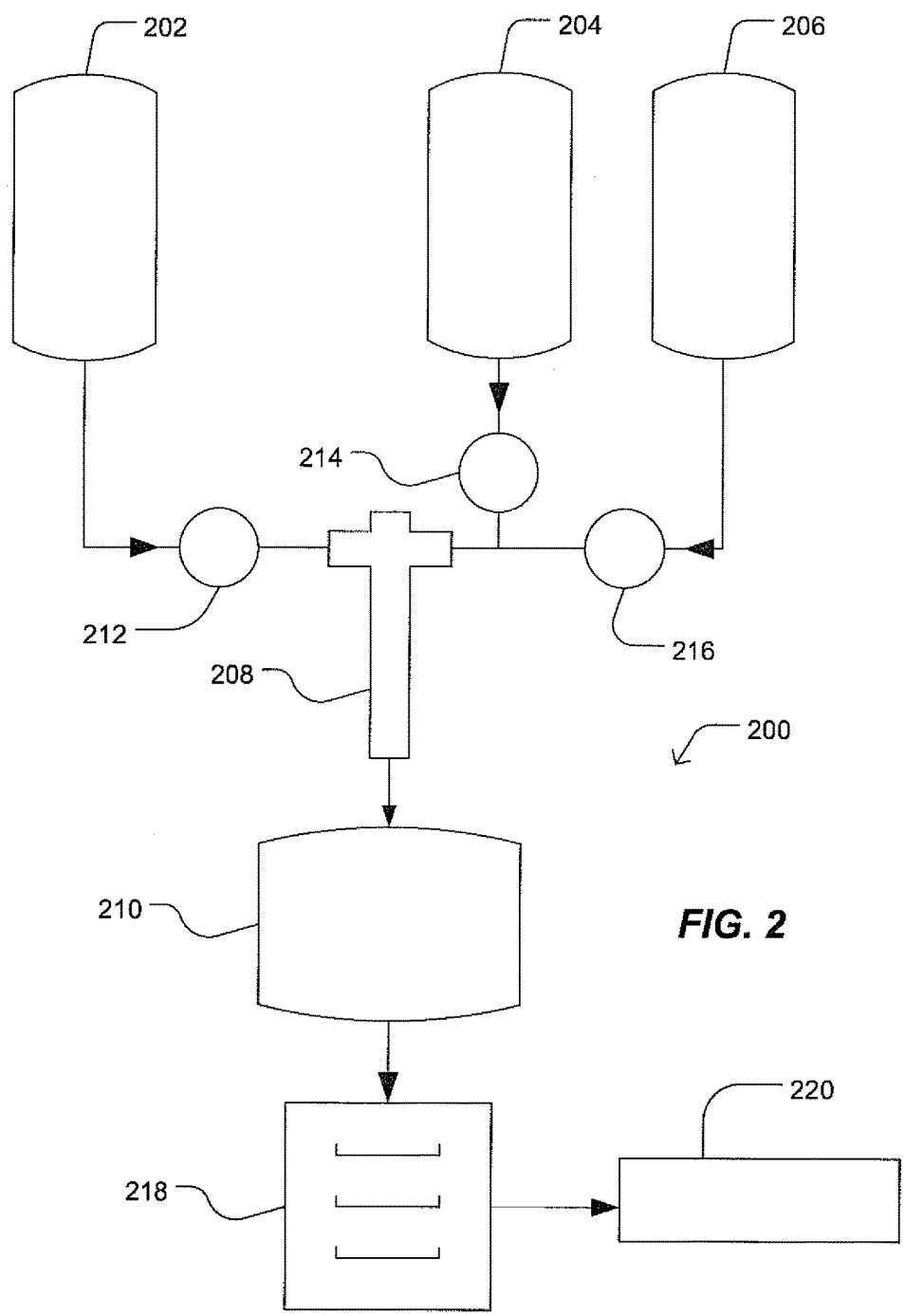
FIG. 2 includes an illustration of an exemplary processing system.

As illustrated in FIG. 2, the reactants are pumped into the reactor 208 using pumps 212, 214, or 216. An alternative method of motivating the reactants into the reactor includes pressurizing the storage vessels 202, 204, or 206. In particular, the reactants are pumped through ports on the reactor that are coaxial and directly opposite, causing the reactant streams to directly impact one another.

The reactor 208 is configured to provide a turbulence intensity of at least $1.5 \times 10^7$ cm/s$^3$ at operating conditions. In an example, the operating conditions include a reaction tube velocity of at least 500 cm/s, such as at least 1000 cm/s, at least 1500 cm/s, or even at least 2000 cm/s. In a particular example, the reaction tube velocity is not greater than 20,000 cm/s, such as not greater than 15,000 cm/s, or even not greater than 10,000 cm/s. For example, the reactor 208 may include a reaction tube having a closed end and an open end. The injection ports may be disposed proximal to the closed end. Further, the ports are coaxial with and directly opposite one another. Once mixed, the reactants flow through the reactor 208 from the closed end towards the open end for a period of at least 50 milliseconds and are directed to a hydrothermal treatment chamber 210.

In a particular embodiment, the resulting primary particles have a particle size in a range of 3 microns to 15 microns, such as a range of 5 microns to 15 microns, a range of 8 microns to 12 microns, or even a range of 9 microns to 11 microns.

Following the reaction in the reactor, the resulting suspension is hydrothermally treated, as illustrated at 108 of FIG. 1, such as in a hydrothermal treatment chamber 210 of FIG. 2. For example, the suspension may be hydrothermally treated in a pressure vessel. The temperature of the treatment may be at least 150° C. and the pressure may be at least 200 psi. For example, the temperature may be at least 180° C., such as at least 200° C., at least 215° C. or even at least 220° C. or higher. In a particular example, the temperature may be as high as 300° C. or higher. Further, the pressure may be at least 225 psi, such as at least 245 psi, at least 250 psi, or even at least 300 psi or higher. The pressure may be as high as 1000 psi or even as high as 1250 psi or higher depending on the saturation pressure at the desired temperature. The hydrothermal treatment is performed for a period of at least 4 hours, such as at least 5 hours, or even at least 6 hours. In an example, the hydrothermal treatment is performed at a temperature in a range of 150° C. to 220° C. and a pressure in a range of 225 psi to 300 psi for a period in a range of 4 hours to 8 hours.

In particular, the pH of the solution is greater than 8. For example, the pH of the solution may be at least 9, such as in a range of 10 to 13. In an example, a solution including tetraalkylammonium hydroxide is added to the hydrothermal treatment system, such as during the hydrothermal treatment, to maintain the pH.

In a particular example, the hydrothermal treatment system is an open system. For example, the hydrothermal treatment vessel may be configured with ports to receive air or additional aqueous solutions and at least one port to release air and steam.

Figure 3:
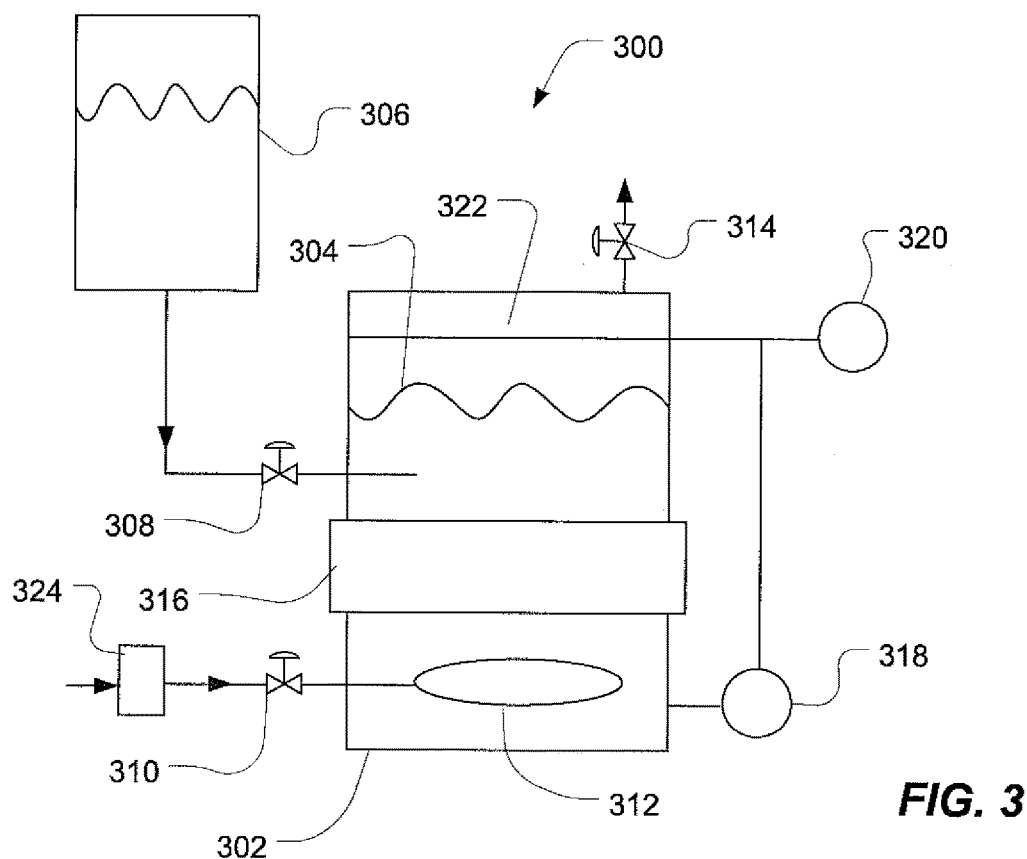
FIG. 3 includes an illustration of a hydrothermal processing system.

In an exemplary embodiment illustrated in FIG. 3, the hydrothermal treatment system 300 includes a pressure vessel 302. For example, the pressure vessel 302 may be configured for pressure of at least 250 psi, such as at least 350 psi, at least 400 psi, or even at least 500 psi or higher. The pressure rating may be has high as 1500 psi or higher. The hydrothermal treatment system 300 also includes a heat source 316. For example, the heat source 316 may be heat tape wrapped around the outside of the pressure vessel 302. In another example, the heat source 316 may be in contact with the bottom of the pressure vessel 302. Alternatively, the heat source 316 may be disposed on the bottom and side of the pressure vessel 302. In a further example, the top of the pressure vessel 302 may be cooled to facilitate reflux. For example, the top of the pressure vessel 302 may include a water or air cooling system 322 or may be free of insulation, resulting in cooling near the top.

In addition, the hydrothermal treatment system may include a source of cool water, such as a vessel 306, coupled via a fluid control system to the pressure vessel 302. For example, the vessel 306 may include water or an aqueous solution including tetraalkylammonium hydroxide. The water or aqueous solution may be at a temperature not greater than 100° C., such as not greater than 50° C. or even approximately room temperature (approximately 25° C.). In an example, the vessel 306 is pressurized to a pressure greater than the pressure of the pressure vessel 302 during hydrothermal treatment and the fluid control system may include a control valve 308. During hydrothermal treatment, the control valve 308 may release fluid from the vessel 306 into the pressure vessel at a location below the level of the fluid 304. Alternatively, the fluid control system may include a pump. The fluid may be provided to the system above the fluid surface 304 or alternatively, may be provided below the fluid surface 304. In particular, the solution may provide a desirable pH and may be used to facilitate thermally-induced mixing and control pH during hydrothermal treatment.

Further, the hydrothermal treatment system 300 may include a source of compressed gas, such as compressed air. As illustrated in FIG. 3, the pressure vessel 302 includes a control valve 310 in communication with a source of compressed gas or high pressure clean dry air and a manifold 312 to distribute the compressed gas. For example, the control valve 310 may introduce compressed air into the pressure vessel 302. The manifold 312 may distribute the air to facilitate mixing in the pressure vessel 302. In particular, the compressed gas or air is provided below the fluid surface 304. The air may be heated or may be at room temperature (approximately 25° C.). A pressure regulator 324 may control the inlet air pressure to tank 302 to ensure adequate air flow into vessel 302 for the application.

With the addition of heat, an aqueous solution, or compressed gas, pressure within the pressure vessel 302 may increase. Pressure may be measured using pressure gauge 320. In addition, the level of fluid within the pressure vessel 302 may be measured, for example, using a differential pressure gauge 318. Alternatively, fluid level may be measured using two separate pressure gauges. To assist the bubbling air mixing process, a control valve 314 coupled to the pressure vessel 302 may release gas, such as air, from the pressure vessel, maintaining a desired pressure and air flow within and from the pressure vessel 302. The continuous addition of compressed gas during the hydrothermal treatment provides an open system.

As a result of the hydrothermal treatment, the average particle size after hydrothermal treatment is in a range of 1 micron to 5 microns, such as a range of 2 microns to 5 microns, or even a range of 3.5 microns to 5 microns. For example, a hydrothermal process that has a pressure of 250 psi and a temperature in the range of 150° C. to 205° C. produces composition-modified barium titanate powder (CMBT) that has a particle mean size of 4.2594 µm (e.g., FIG. 4). After the CMBT powders have completed an acceptable decomposition and calcining process where the maximum temperature is in the range of 1050° C. to 1150° C. over an acceptable time period and in a flushing air environment, the particle mean size is reduced to 0.67074 µm (e.g., FIG. 5). As illustrated in the Examples, desirable homogeneity is achieved through the hydrothermal process. The reduction in particle size indicates the level of transformation of the particles amorphous phase to the crystalline phase during the calcining process. The Quantitative X-Ray Diffraction data illustrated, for example, in FIG. 6 reflects the desirable homogeneity and cubic perovskite crystalline structure also produced after the calcining process. An exemplary SEM picture of the calcined powders is illustrated in FIG. 7 where the cubic or face centered structure is indicated. The achieved packaging density of these powders after hot pressing at a low temperature of 1100° C. and a pressure of 2500 psi is approximately 89%. Such a temperature and pressure is generally not sufficient to affect the particle size but only to compact and provide adhesion the powders.

Returning to FIG. 1, the resulting particulate may be optionally washed, separated from the suspension, and optionally dried, as illustrated at 110 and 112. In an example, the ceramic particulate may be washed using deionized water or an alcohol water mixture. In a further example, the ceramic particulate may be dried in a drier 218 of FIG. 2, such as through spray drying, pan drying, flash drying or other drying procedures. In particular, the particulate may be washed, concentrated, such as through centrifuging, and flash dried.

Such temperatures are examples, and similar results can be achieved with somewhat lower temperatures. To avoid any decomposition of the ammonium oxalate or tetramethylammonium oxalate for the formation of the hydrated oxalate-hydroxide co-precipitate and the subsequent oven drying thereof, the 99° C. temperature should not be exceeded.

The dried particulate may be subjected to decomposition and calcining, as illustrated at 114 of FIG. 1 or 220 of FIG. 2, for example, in an oxygenated atmosphere, such as air, and may be subjected to particle agitation. During calcination in air of the product powder, half of the oxygen of the oxalate anion in its thermal decomposition becomes part of a mixed oxide compound and the other half with all the carbon is converted by oxidation to carbon dioxide gas. Solution residuals such as: ammonium oxalate $[(NH_4)_2C_2O_4]$ (any excess amount) or tetramethylammonium oxalate $\{[(CH_3)_4N]_2C_2O_4\}$ (any excess amount), tetramethylammonium hydroxide $[(CH_3)_4NOH]$ (any excess amount), ammonium nitrate ($NH_4NO_3$), ammonium 2-hydroxypropanate $[CH_3CH(OH)COONH_4)]$, and triammonium 2-hydroxy-1,2,3-propanetricarboxylate $[(OH)C(COONH_4)(CH_2COONH_4)_2]$ also decompose. These residuals are thermally decomposed and oxidized and thereby completely converted to gaseous products such as $H_2O$, $NH_3$, $CO$, $CO_2$, $N_2$, $N_2O$, $NO$, and $NO_2$. The decomposition of these residuals occurs over specified temperature ranges, rates of temperature increase, with acceptable clean dry air flow to assist in sweeping the gaseous products away at an acceptable rate. The same decomposition generally applies to any 2-hydroxycarboxylic acid that may be selected as a chelating agent, as described below. In an example, the powder is calcined under suitable conditions, e.g., at 1050° C. in air in an appropriate silica glass (fused quartz) tray or tube. The maximum calcining temperature can be higher or lower depending on the application.

In particular, the method exhibits desirable conversion of raw materials. In general, the metal ion components or reactants are expensive. The above method provides a desirably high percent conversion of the raw materials, particularly the metal ion components of reactants. For example, the above methods may provide a percent yield of at least 98%, such as at least 99%, or even at least 99.5%. Such desirable conversion reduces waste and contamination of downstream processes.

When the co-precipitation reaction is performed, with the use of the above-described ammonium oxalate or tetramethylammonium oxalate and tetramethylammonium hydroxide solution as the precipitant, the powder particle size distribution range is reduced by a factor of four or more over that of previous efforts, and the powder is free flowing. The free-flowing powder characteristics are observed by motion of the powder in a transparent plastic or glass container.

As a result of the process, a desirable dielectric particulate is provided. In particular, the dielectric particulate has a desirable particle size and particle size distribution. For example, the average (mean) particle size is at least 0.6 µm, excluding particles of size less than 0.1 micrometers or greater than 10 micrometers, such as at least 0.7 µm. In an example, the average particle size is in a range of 0.6 to 2 µm, such as a range of 0.7 to 1.5 µm, a range of 0.9 to 1.5 µm, a range of 0.9 to 1.4 µm, or a range of 1.2 to 1.5 µm. Alternatively, the average particle size may be in a range of 0.6 to 1 µm, such as 0.6 to 0.9 µm, or even a range of 0.7 to 0.9 µm. In any case, the particle size distribution exhibits a half height ratio of not greater than 0.5. The half height ratio is defined as the ratio of the width of the particle size distribution at half of its maximum height and the average (mean) particle size for the distribution peak centered around the mean size. For example, the half height ratio may be not greater than 0.45, such as not greater than 0.4, not greater than 0.3, or even not greater than 0.2. Further, the standard deviation may be not greater than 2.0 micrometers, such as not greater than 1.5 micrometers, not greater than 1.3 micrometers, not greater than 1.2 micrometers, or even not greater than 1.15 micrometers.

Figure 6:
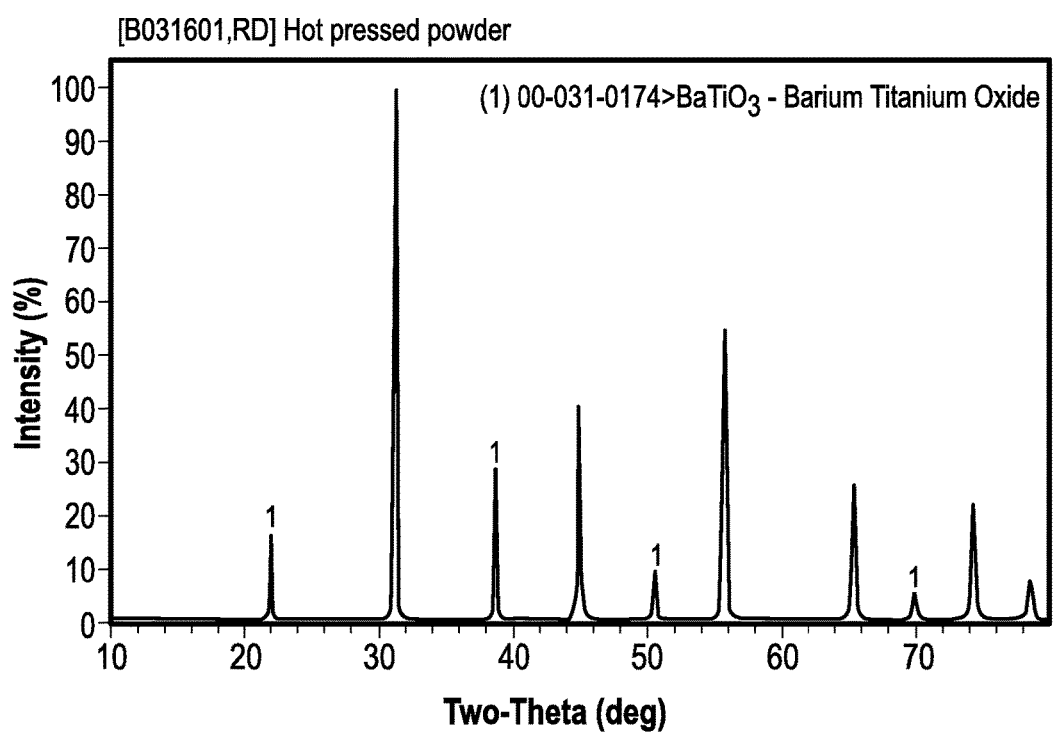
FIG. 6 includes a graph illustrating x-ray diffraction data of the particles fabricated in accordance with Example 1.
Figure 7:
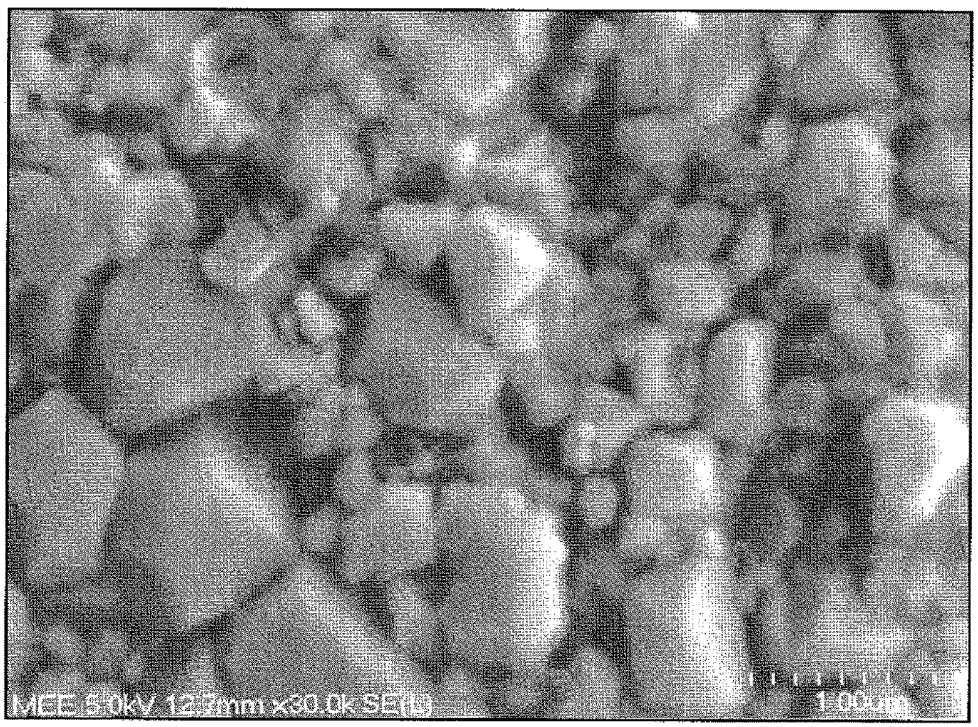
FIG. 7 includes an image illustrating SEM data related to the powders fabricated in accordance with Example 1

Yet another feature of the processing is indicated in FIG. 6, which includes an illustration of x-ray diffraction of the CMBT powder formed by a method similar to that described in Example 1, where the data indicates substantially uniform cubic perovskite crystal structure. The high peaks, the narrowness of the peaks indicate a substantially uniform crystalline structure and the quantitative data indicates a substantial homogeneity of the powder. Embodiments of the above-described processes result in CMBT powders having the substantially uniform crystalline structure, as the x-ray diffraction data of FIG. 6 indicates. As illustrated in FIG. 6, the resulting powders can consist essentially of chemically homogenous cubic perovskite crystals, not including amorphous phases or chemical inhomogeneities that would cause a decrease in permittivity or break down voltage. Also, the CMBT powder is substantially free of $BaCO_3$, the barium carbonate data indicating the elimination of activating chemical from the powders during the decomposition and calcining process to at least the parts per trillion level or lower. Further, the above analysis indicates that the CMBT powders are paramagnetic in a desired temperature range and have a high relativity permittivity. CMBT powders with high relative permittivity are useful in forming high energy storage capacitors that can provide high energy storage units.

In an example, the dielectric particulate exhibits a desirable relative permittivity, such as at least 15,000, at least 17,500, at least 18,000, or even at least 20,000. In an example, the relative permittivity may be at least 30,000, such as at least 35,000, at least 50,000, or even at least 80,000 or higher.

In a particular embodiment, the dielectric particulate is a composition-modified barium titanate powder. The barium is at least partially substituted with calcium, neodymium, lanthanum, or a combination thereof, and the titanium is at least partially substituted with at least one of zirconium, yttrium, manganese, neodymium, tin, zinc, vanadium, niobium, tantalum, molybdenum, tungsten, hafnium, chromium, or any combination thereof. The composition modified barium titanate powder has an average particular size in a range of 0.6 to 1.5 micrometers, and a half width ratio of not greater than 0.5.

EXAMPLES

Example 1

Two reactant streams are introduced into a tube reactor. The first stream includes barium nitrate, organic titanium chelate available under the Tradename Tyzor® from DuPont™ and trace amounts of other metal nitrates and metal or oxometal citrates, including metals selected from calcium, zirconium, yttrium, manganese, neodymium, tin, zinc, vanadium, niobium, tantalum, molybdenum, tungsten, lanthanum, hafnium, or chromium. The second stream includes a mixture of tetramethylammonium hydroxide and tetramethylammonium oxalate. The first stream has a flow rate about four times greater than the flow rate of the second stream. The tube reactor has a turbulence intensity of approximately $8.3 \times 10^{10}$ $cm/s^3$ and a Reynolds number of approximately 78,000. The pH of the solution is maintained between 10 and 12 and the temperature is approximately 95° C. for both streams.

The particulate material formed in the reactor is hydrothermally treated using a pressure tank with a rating of 300 psi at 150° C. The tank top is chilled to condense water vapor, thereby ensuring the solution volume remains constant for the duration of the treatment. When the liquid stream including the particulate is delivered to the tank, the process parameters are set at 250 psi and 150° C. for six-hours. Tetramethylammonium hydroxide is added to maintain the pH in a range of 10 to 12.

Figure 4:
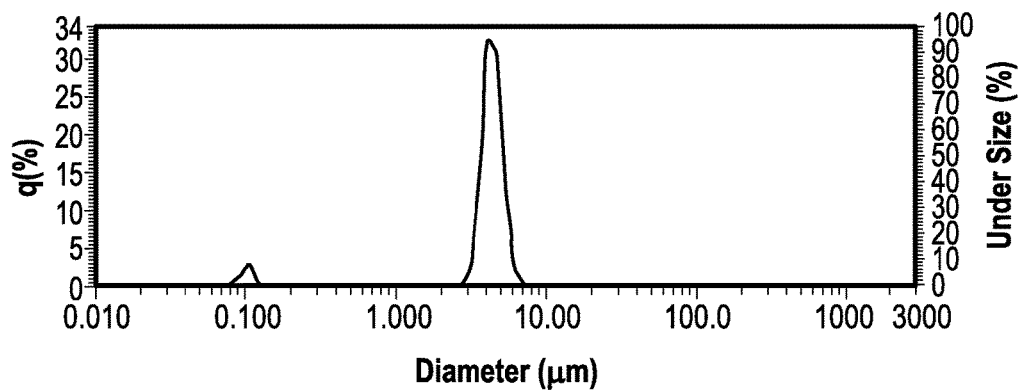
FIG. 4 and FIG. 5 include graphs illustrating particle size distributions of the particles fabricated in accordance with Example 1 after the hydrothermal process and after completion of the calcining process, respectively.
Figure 5:
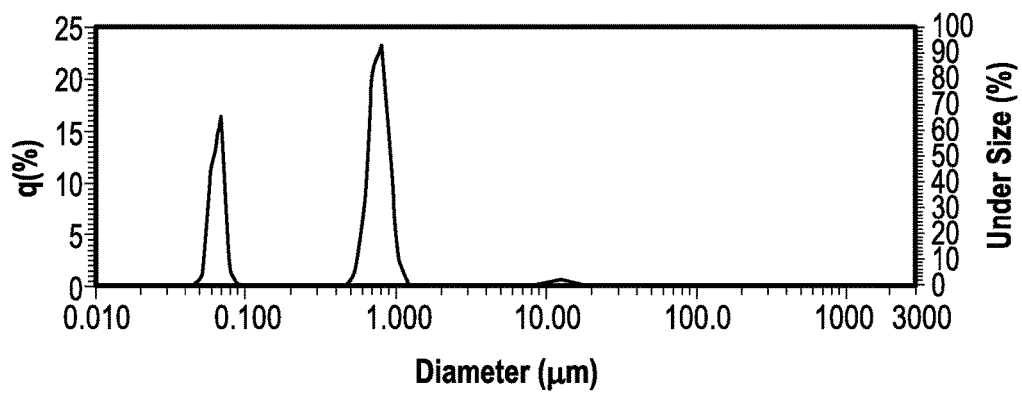

Following hydrothermal treatment, the particles are washed, concentrated in a centrifuge, flash dried, and subjected to decomposition and calcining at temperatures in a range of 25° C. to 1050° C. or higher. FIG. 4 illustrates the particle distribution following hydrothermal treatment. As illustrated, the mean particle size is approximately 4.24 μm and the standard deviation is approximately 1.16 μm. FIG. 5 illustrates the particle size distribution following decomposition and calcining. The mean particle size is 0.67 μm and the standard deviation is 1.14 μm. FIG. 6 illustrates the nature of the crystal, indicating that the crystal is homogenous cubic perovskite crystal and may have a high-permittivity.

Example 2

For Example 2, streams 1 and 2 are the same as in Example 1. The two reactant streams are introduced into a tube reactor. The first stream includes barium nitrate, organic titanium chelate available under the tradename Tyzor® from DuPont™, and trace amounts of other metal nitrates and metal or oxometal citrates, including metals selected from calcium, zirconium, yttrium, manganese, neodymium, tin, zinc, vanadium, niobium, tantalum, molybdenum, tungsten, lanthanum, hafnium, or chromium. The second stream includes a mixture of tetramethylammonium hydroxide and tetramethylammonium oxalate. The first stream has a flow rate about four times greater than the flow rate of the second stream. The tube reactor has a turbulence intensity of approximately $1.9 \times 10^7$ $cm/s^3$ and a Reynolds number of approximately 27,000.

The particulate material formed in the reactor is hydrothermally treated using a pressure tank with a rating of 300 psi at 150° C. The tank top is chilled to condense water vapor, thereby ensuring the solution volume remains constant for the duration of the treatment. When the liquid stream including the particulate is delivered to the tank, the process parameters are set at 250 psi and 150° C. for six-hours. The pH is maintained in a range of 10 to 12.

To determine percent yield, the composition of the aqueous starting precursors is verified. After the co-precipitation process is complete, the solid is removed and the remaining liquid is analyzed. The percentage of each constituent that has entered the composition modified barium titanate (CMBT) powder is determined. Analysis of the aqueous solutions is performed on a Perkin Elmer Optima 2100DV ICP-OES (induction-coupled-plasma optical-emission spectrograph). A calibration curve is generated for each analysis based on standards from High Purity Standards, Inc. At least eight standard solutions are used in calibration ranging from 0.0500 ppm to 10.0 ppm. The correlation coefficient of the calibration curves generated is greater than 0.999 for all constituents over the entire concentration range. Each calibration curve is manually inspected to insure there are no erroneous points influencing the linear correlation. The analysis and dilutions are performed in triplicate. Initial concentrations of the seven constituents are summarized in Table 3 and ranged from 30 to nearly 40,000 ppm. Analysis of the liquid after filtering out the CMBT powder shows constituent concentrations less than 10 ppm equating to nearly a 100% yield of each constituent in the CMBT powder.

TABLE 3

Liquid Analysis for Powder Preparation

|  | Pre Process (ppm) | Pre Process (mg) | Post Process (ppm) | Post Process (mg) | Percent Yield (%) |
|---|---|---|---|---|---|
| Barium | 39133 | 290601 | 9.25 | 1690 | 99.42 |
| Tyzor ® | 11100 | 82428 | 0.107 | 2.24 | 100.00 |
| COMP #1 | 4200 | 31189 | 0.090 | 1.88 | 99.99 |
| COMP #2 | 56.06 | 416.3 | 0.091 | 1.90 | 99.54 |
| COMP #3 | 88.00 | 653.5 | <0.050 | 0.00 | 100.00 |
| COMP #4 | 30.00 | 222.8 | <0.050 | 0.00 | 100.00 |
| COMP #5 | 456.0 | 3386 | 0.386 | 8.07 | 99.76 |

Following hydrothermal treatment, the particles are washed, concentrated in a centrifuge, flash dried, and subjected to decomposition and calcining at temperatures in a range of 25° C. to 1050° C. or higher. Following decomposition and calcining, the mean particle size is approximately 1.38 μm and the half width ratio is less than 0.44. The relative permittivity (K) is in the range of 18,500 to 125,000 or higher over the temperature range of −20° C. to 65° C. or even a wider temperature range depending on the application.

Example 3

A process similar to the process of Example 2 is performed using nine constituent metal ions. The nine constituents in the starting aqueous mixture range in concentration from 50 to several thousand ppm. After the powder production process is complete, the constituents range from undetectable concentrations to a maximum of 8.44 ppm. The percent each of the constituent crystallized in the composition-modified barium titanate powder range from 99.52% to 100% as summarized in Table 4.

TABLE 4

Liquid Analysis for Powder Preparation

|  | Pre Process (ppm) | Pre Process (mg) | Post Process (ppm) | Post Process (mg) | Percent Yield (%) |
|---|---|---|---|---|---|
| Barium | 41500 | 307888 | 8.44 | 1488 | 99.52 |
| Tyzor ® | 11780 | 87396 | 0.503 | 10.51 | 99.99 |
| COMP #1 | 4890 | 36278 | 0.604 | 12.62 | 99.97 |
| COMP #2 | 266.3 | 1976 | <0.050 | 0.00 | 100.00 |
| COMP #3 | 102.7 | 761.7 | <0.050 | 0.00 | 100.00 |
| COMP #4 | 589.3 | 4372 | <0.050 | 0.00 | 100.00 |
| COMP #5 | 77.60 | 575.7 | <0.050 | 0.00 | 100.00 |
| COMP #6 | 525.1 | 3895 | 0.388 | 8.11 | 99.79 |
| COMP #7 | 47.52 | 352.6 | <0.050 | 0.00 | 100.00 |

Example 4

Table 5 illustrates the relationship of reaction tube inside diameter to stream velocity, turbulence intensity, and Reynolds number, and reaction tube length for a given total flow rate and residence time.

TABLE 5

Flow Characteristics for Reaction Tubes

| Reaction Tube Diameter D Cm | Liquid Flow Rate $Q_L$ L/min | Stream Velocity V Cm/s | Turbulence Intensity $T_i$ cm/s$^3$ | Reynolds Number Re | Tube Length (80 ms residence time) L Cm |
|---|---|---|---|---|---|
| 0.3175 | 10.367 | 2182 | 1.031X1011 | 69,288 | 174.58 |
| 0.6350 | 10.367 | 545.6 | 4.02.7X108 | 34,644 | 43.65 |
| 1.270 | 10.367 | 136.4 | 1.573X106 | 17,322 | 10.91 |
| 2.540 | 10.367 | 34.10 | 6145 | 8661 | 2.728 |
| 5.080 | 10.367 | 8.525 | 24 | 4331 | 0.682 |
| 10.160 | 10.367 | 2.131 | 0.096 | 2165 | 0.170 |

Orifice diameter D: 0.125" (3.175 mm)
US gal/min flow coefficient CV: 0.300
ISO L/min flow coefficient KV: 4.325
Conversion factor: one KV=14.4163 CV
Pressure drop ΔP across orifice: 100 psig (6.8948 barg)
Specific gravity SG relative to pure water at 4° C. of one g/cm$^3$: 1.20
Viscosity μ relative to pure water at 20° C. of one mPa·s=one cp: 1.20

It has been discovered that wet-chemical methods involving the use of water-soluble hydrolytically stable metal-ion chelate precursors and an oxalate compound and tetramethylammonium hydroxide precipitant solution can be used in a co-precipitation procedure for the preparation of ceramic powders. The precursor solution is at neutral or near-neutral pH. The solution including ammonium oxalate or tetraalkylammonium oxalate and tetramethylammonium hydroxide are sufficiently basic to provide, at the time of reaction with the precursor solution, a pH of about 8.5 for the mixing solutions. A composition-modified barium titanate is one of the ceramic powders that can be produced. Certain metal-ion chelates can be prepared from 2-hydroxypropanoic acid and ammonium hydroxide.

It has been also discovered that tetraalkylammonium oxalate, such as tetramethylammonium oxalate $\{[(CH_3)_4N]_2C_2O_4\}$, may be substituted for ammonium oxalate $[(NH_4)_2C_2O_4]$. Tetraalkylammonium oxalate provides higher molar water solubility below 60° C. than ammonium oxalate, facilitating ease of handling aqueous solutions over a wider temperature range. To reduce liquid volume handling the ammonium oxalate solution had to be heated whereas the tetramethylammonium oxalate does not below 60° C. Tetraalkylammonium oxalate provides pH control during the reflux operation, whether at atmospheric pressure or under hydrothermal conditions, whereas ammonium oxalate utilizes a closed system to prevent the loss of ammonia ($NH_3$) from the solution, which in turn results in lowering the pH. The ammonium cation $[(NH_4)^+]$ of ammonium oxalate combines with the hydroxyl anion $[(OH)^-]$ to from the weak base ammonium hydroxide [$NH_4OH$], which then escapes from the solution as ammonia gas ($NH_3$) in an open system. The ammonium cation of the ammonium salts of the metal-ion chelate compounds in solution act, of course, in the same way. The substitution of tetramethylammonium oxalate for ammonium oxalate eliminates a source of ammonium cations and permits operation in an open system with its advantage of having available solution/slurry agitation with flow through of bubbling air. The pH can be monitored throughout the reflux period and tetramethylammonium hydroxide [$(CH_3)_4NOH$] can be used to maintain the pH at a level around 8.0 to 12.0 pH. Further, tetramethylammonium salts of the metal-ion chelate compounds can be formed by substituting ammonium hydroxide in the above-described process for forming chelates.

In one embodiment in accordance with the invention a method is disclosed. A plurality of precursor materials in solution is provided. Each of the plurality of precursor materials in solution further comprises at least one constituent ionic species of a ceramic powder. The plurality of precursor materials in solution is combined with an ammonium oxalate or tetramethylammonium oxalate and tetramethylammonium hydroxide precipitant solution to cause co-precipitation of the ceramic powder in a combined solution. The ceramic powder is separated from the combined solution.

In another embodiment in accordance with the invention, a substantially contaminant-free ceramic powder produced by a process is disclosed. The process comprises: providing a plurality of precursor materials in solution, wherein each of the plurality of precursor materials in solution further comprises at least one constituent ionic species of the ceramic powder, and wherein at least one of the plurality of precursor materials in solution is a chelate solution; combining the plurality of precursor materials in solution with an ammonium oxalate or tetramethylammonium oxalate and tetramethylammonium hydroxide precipitant solution in the range of 8.0 to 12.0 pH to cause co-precipitation of the ceramic powder in a combined solution; and separating the ceramic powder from the combined solution.

In a first aspect, a method for preparing a ceramic powder includes providing a plurality of precursor materials in solution, combining the plurality of precursor materials in solution with a precipitant solution including an oxalate compound and tetraalkylammonium hydroxide to cause co-precipitation of the ceramic powder in a combined solution, and separating the ceramic powder from the combined solution. Each of the plurality of precursor materials in solution further includes at least one constituent ionic species of a ceramic powder. A first precursor material includes a barium source, a second precursor includes a titanium source, and a third precursor includes a metal ion or oxometal ion and a chelating agent. The chelating agent is 2-hydroxypropanoic acid or an alpha-hydroxycarboxylic acid selected from the group consisting of 2-hydroxyethanoic acid, 2-hydroxybutanedioic acid, 2,3-dihydroxybutanedioic acid, 2-hydroxy-1,2,3-propanetricarboxylic acid, 2-hydroxybutanoic acid, 2-hydroxypentanoic acid, and 2-hydroxyhexanoic acid.

In an example of the first aspect, the oxalate compound includes ammonium oxalate. In another example of the first aspect, the barium source includes barium nitrate. In a further example, the plurality of precursor materials further include Ca(NO3)2. In an additional example of the first aspect, the titanium source includes a titanium chelate. In a further example of the first aspect, the metal ion or oxometal ion of the metal chelate includes at least one of: Nd, Zr, Mn, La, Y, Pr, Sm, Gd, Dy, Er, Ho, Yb, Ga, Ag, Dy, Er, Ho, Nb, and Mo.

In another example of the first aspect, the method further includes preparing the third precursor using a chelating agent, the chelating agent being one of the 2-hydroxypropanoic acid or the alpha-hydroxycarboxylic acid. The method can further include reacting a metal alkyl oxide with the chelating agent and a weak base solution. Alternatively, the method can further include reacting at least one of a metal-ion carbonate, a metal-ion nitrate, and an oxometal-ion nitrate with the chelating agent and a weak base solution.

In an additional example, combining further includes mixing the plurality of precursor materials in solution and the precipitant solution in a fluid jet column. The method can further include introducing the plurality of precursor materials in solution in a first stream and introducing the precipitant solution in a second stream.

In a further example, the method further includes drying the separated ceramic powder and calcining the separated ceramic powder. The ceramic powder can include a cubic perovskite composition modified barium titanate.

In a second aspect, a method for preparing a ceramic powder includes providing a plurality of precursor materials in solution, combining the plurality of precursor materials in solution with a precipitant solution including an oxalate compound and tetraalkylammonium hydroxide to cause co-precipitation of the ceramic powder in a combined solution, and separating the ceramic powder from the combined solution. Each of the plurality of precursor materials in solution further includes at least one constituent ionic species of a ceramic powder. A first precursor material includes barium nitrate, a second precursor includes a titanium chelate, and a third precursor includes a metal ion or oxometal ion and a chelating agent. The chelating agent is 2-hydroxypropanoic acid or an alpha-hydroxycarboxylic acid selected from the group consisting of 2-hydroxyethanoic acid, 2-hydroxybutanedioic acid, 2,3-dihydroxybutanedioic acid, 2-hydroxy-1,2,3-propanetricarboxylic acid, 2-hydroxybutanoic acid, 2-hydroxypentanoic acid, and 2-hydroxyhexanoic acid.

In an example of the second aspect, the oxalate compound includes ammonium oxalate. In another example, the metal ion or oxometal ion of the metal chelate includes at least one of: Nd, Zr, Mn, La, Y, Pr, Sm, Gd, Dy, Er, Ho, Yb, Ga, Ag, Dy, Er, Ho, Nb, and Mo. In an additional example, the plurality of precursor materials further include $Ca(NO_3)_2$.

In a further example, the method includes drying the separated ceramic powder and calcining the separated ceramic powder. In a particular example, the ceramic powder includes a cubic perovskite composition modified barium titanate.

In a third aspect, a method for preparing a ceramic powder includes providing a plurality of precursor materials in solution, combining the plurality of precursor materials in solution with a precipitant solution including ammonium oxalate and tetraalkylammonium hydroxide to cause co-precipitation of the ceramic powder in a combined solution, separating the ceramic powder from the combined solution, drying the separated ceramic powder, and calcining the separated ceramic powder to form a ceramic powder including cubic perovskite composition-modified barium titanate. Each of the plurality of precursor materials further includes at least one constituent ionic species of a ceramic powder. A first precursor material includes barium nitrate, a second precursor includes a titanium chelate, and a third precursor includes a metal ion or oxometal ion and a chelating agent. The chelating agent is 2-hydroxypropanoic acid or an alpha-hydroxycarboxylic acid selected from the group consisting of 2-hydroxyethanoic acid, 2-hydroxybutanedioic acid, 2,3-dihydroxybutanedioic acid, 2-hydroxy-1,2,3-propanetricarboxylic acid, 2-hydroxybutanoic acid, 2-hydroxypentanoic acid, and 2-hydroxyhexanoic acid.

In an example of the third aspect, the metal ion or oxometal ion of the metal chelate includes at least one of: Nd, Zr, Mn, La, Y, Pr, Sm, Gd, Dy, Er, Ho, Yb, Ga, Ag, Dy, Er, Ho, Nb, and Mo. In another example, the plurality of precursor materials further include $Ca(NO_3)_2$.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for preparing a ceramic powder, the method comprising:
    injecting a first solution stream into a reactor the first solution stream comprising a first precursor material including a barium source, a second precursor including a titanium source, and a third precursor comprising a metal ion or oxometal ion and a chelating agent, the chelating agent being an alpha-hydroxycarboxylic acid;
    concurrently with injecting the first solution stream into the reactor, injecting a second solution stream into the reactor, the second solution stream comprising a precipitant solution including an oxalate compound and tetraalkylammonium hydroxide, to cause co-precipitation of hydrated hydroxide-oxalate precipitates in a combined solution, wherein the hydrated hydroxide-oxalate precipitates are partially crystalline, wherein injecting the first solution stream and the second solution stream into the reactor is performed at a turbulence factor of at least $1.5 \times 10^7$ cm/s$^3$, wherein a residence time within the reactor is at least 50 milliseconds;
    hydrothermally treating the hydrated hydroxide-oxalate precipitates of the combined solution in an aqueous suspension by heating the aqueous suspension at a temperature of at least 150° C. at a treatment pressure of at least 200 psi; and
    after hydrothermally treating, decomposing and calcining to form the ceramic powder including composition-modified barium titanate particles.

2. The method of claim 1, wherein after decomposing and calcining, excluding particles having a size of less than 0.1 micrometers and excluding particles having a size greater than 10 micrometers, the composition-modified barium titanate particles have an average particle size in a range of 0.6 micrometers to 1.5 micrometers.

3. The method of claim 1, wherein heating the aqueous suspension solution is performed for a time period of 4 hours to 8 hours.

4. The method of claim 1, wherein hydrothermally treating the hydrated hydroxide-oxalate precipitates of the combined solution includes adding the aqueous suspension at a temperature of not greater than 100° C. to a hydrothermal treatment vessel while heating the hydrothermal treatment vessel and while releasing steam from the hydrothermal treatment vessel.

5. The method of claim 1, wherein after decomposing and calcining, the ceramic powder is free of ball-milling debris.

6. The method of claim 1, wherein the composition-modified barium titanate particles include $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_zO_3$, where A=Ag, A'=Dy, Er, Ho, Y, Yb, or Ga; D=Nd, Pr, Sm, or Gd; D'=Nb or Mo, $0.10 \le x \le 0.25$; $0 \le \mu \le 0.01$, $0 \le \mu' \le 0.01$, $0 \le \nu \le 0.01$, $0 \le \nu' \le 0.01$, $0 < \delta \le 0.01$, $0.995 \le z \le 1$, and $0 \le \alpha \le 0.005$.

7. A method for preparing a ceramic powder of a general formula of $ABO_3$, the method comprising:
    providing a first solution including a plurality of precursor materials, the first solution having a molar ratio of a total A precursor content to a total B precursor content of 1;
    combining the first solution with a second solution, the second solution including an oxalate compound and tetraalkylammonium hydroxide, wherein combining the first solution and the second solution causes co-precipitation of hydrated hydroxide-oxalate precipitates in a combined solution, wherein the hydrated hydroxide-oxalate precipitates are partially crystalline;
    performing a hydrothermal treatment on the hydrated hydroxide-oxalate precipitates of the combined solution; and
    after performing the hydrothermal treatment, decomposing and calcining to form the ceramic powder, wherein within the ceramic powder, a molar ratio of a total A content to a total B content is 1, and the ceramic powder includes composition-modified barium titanate particles.

8. The method of claim 7, wherein:
    the molar ratio of the total A precursor content to the total B precursor content is 1.000; and
    within the ceramic powder, the molar ratio of a total A content to the total B content is 1.000.

9. The method of claim 8, wherein, after decomposing and calcining, the ceramic powder is free of ball-milling debris.

10. The method of claim 7, wherein the hydrothermal treatment is performed at a temperature of at least 150° C. and at a pressure of at least 200 psi for a time period of 4 hours to 8 hours.

11. The method of claim 7, wherein decomposing and calcining is performed at a maximum temperature in a range of 1050° C. to 1150° C.

12. The method of claim 7, wherein after decomposing and calcining, excluding particles having a size of less than 0.1 micrometer and excluding particles having a size greater than 10 micrometers, and wherein the composition-modified barium titanate particles have an average particulate size in a range of 0.6 to 1.5 micrometers.

13. The method of claim 7, wherein the composition-modified barium titanate particles include $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_z O_3$, where A=Ag, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 < \delta \leq 0.01$, $0.995 \leq z \leq 1$, and $0 \leq \alpha \leq 0.005$.

14. A method for preparing a ceramic powder of a general formula of $ABO_3$, the method comprising:

combining a first solution including a plurality of precursor materials with a second solution to cause co-precipitation of hydrated hydroxide-oxalate precipitates in a combined solution, wherein the hydrated hydroxide-oxalate precipitates are partially crystalline, the first solution including at least a barium containing material and a titanium containing material, the second solution including an oxalate compound and tetraalkylammonium hydroxide;

heating the hydrated hydroxide-oxalate precipitates of the combined solution at a temperature of at least 150° C. at a treatment pressure of at least 200 psi; and decomposing and calcining to form the ceramic powder including composition-modified barium titanate particles, wherein after decomposing and calcining, the ceramic powder is free of ball-milling debris.

15. The method of claim 14, further comprising hot pressing the ceramic powder after decomposing and calcining.

16. The method of claim 14, wherein excluding particles having a size of less than 0.1 micrometers and excluding particles having a size or greater than 10 micrometers, the composition-modified barium titanate particles have an average particulate size in a range of 0.6 to 1.5 micrometers.

17. The method of claim 16, wherein decomposing and calcining is performed at a maximum temperature of no greater than 1150° C.

18. The method of claim 14, the composition-modified barium titanate particles include $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_z O_3$, where A=Ag, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 < \delta \leq 0.01$, $0.995 \leq z \leq 1$, and $0 \leq \alpha \leq 0.005$.

19. The method of claim 18, wherein $\nu > 0$, $\alpha > 0$, $\delta > 0$, and $\mu > 0$.

* * * * *